(12) United States Patent
Rajput et al.

(10) Patent No.: US 11,818,570 B2
(45) Date of Patent: Nov. 14, 2023

(54) METHODS, SYSTEMS, AND COMPUTER READABLE MEDIA FOR MESSAGE VALIDATION IN FIFTH GENERATION (5G) COMMUNICATIONS NETWORKS

(71) Applicant: Oracle International Corporation, Redwood Shores, CA (US)

(72) Inventors: Jay Rajput, Bangalore (IN); Shashikiran Bhalachandra Mahalank, Bangalore (IN); Koushik Das, Bangalore (IN)

(73) Assignee: ORACLE INTERNATIONAL CORPORATION, Redwood Shores (CA)

( * ) Notice: Subject to any disclaimer, the term of this patent is extended or adjusted under 35 U.S.C. 154(b) by 59 days.

(21) Appl. No.: 17/123,038

(22) Filed: Dec. 15, 2020

(65) Prior Publication Data
US 2022/0191694 A1     Jun. 16, 2022

(51) Int. Cl.
*H04W 12/06* (2021.01)
*H04W 12/0433* (2021.01)
(Continued)

(52) U.S. Cl.
CPC ............ *H04W 12/06* (2013.01); *H04W 8/08* (2013.01); *H04W 12/0431* (2021.01);
(Continued)

(58) Field of Classification Search
CPC ... H04W 12/06; H04W 8/08; H04W 12/0431; H04W 12/0433; H04W 48/16; H04W 84/042; H04W 12/69
See application file for complete search history.

(56) References Cited

U.S. PATENT DOCUMENTS 6,091,958 A     7/2000   Bergkvist et al.
6,151,503 A    11/2000   Chavez
(Continued)

FOREIGN PATENT DOCUMENTS

CN      101277541 A    10/2008
CN       10135561 A     1/2009
(Continued)

OTHER PUBLICATIONS

Non-Final Office Action for U.S. Appl. No. 17/009,683 (dated Jul. 15, 2022).
(Continued)

*Primary Examiner* — Alexander Lagor
*Assistant Examiner* — Lydia L Noel
(74) *Attorney, Agent, or Firm* — Jenkins, Taylor & Hunt, P.A.

(57) ABSTRACT

Methods, systems, and computer readable media for message validation in fifth generation (5G) communications networks are disclosed. One method occurring at a first network node of a first network comprises: obtaining, from at least one authentication and key agreement (AKA) procedure related message associated with a user device communicating via a second network, authentication information identifying the user device; storing the authentication information in a data store for validating subsequent messages; receiving a request message associated with the user device; determining, using the authentication information, that the request message is invalid; and in response to determining that the request message is invalid, performing an invalid message action.

15 Claims, 8 Drawing Sheets

(51) Int. Cl.
*H04W 12/0431* (2021.01)
*H04W 8/08* (2009.01)
*H04W 48/16* (2009.01)
*H04W 84/04* (2009.01)

(52) U.S. Cl.
CPC ....... *H04W 12/0433* (2021.01); *H04W 48/16* (2013.01); *H04W 84/042* (2013.01)

(56) References Cited

U.S. PATENT DOCUMENTS

| | | |
|---|---|---|
| 6,292,666 B1 | 9/2001 | Siddiqui et al. |
| 6,308,075 B1 | 10/2001 | Irten et al. |
| 6,343,215 B1 | 1/2002 | Calabrese et al. |
| 6,591,101 B1 | 7/2003 | Shimbori |
| 7,043,754 B2 | 5/2006 | Arnouse |
| 7,567,661 B1 | 7/2009 | Wood et al. |
| 8,045,956 B2 | 10/2011 | Sun et al. |
| 8,145,234 B1 | 3/2012 | Leonard et al. |
| 8,509,074 B1 | 8/2013 | Roberts et al. |
| 8,615,217 B2 | 12/2013 | Ravishankar et al. |
| 8,879,431 B2 | 11/2014 | Ridel et al. |
| 9,015,808 B1 | 4/2015 | Koller et al. |
| 9,060,263 B1 | 6/2015 | Carames et al. |
| 9,106,428 B2 | 8/2015 | Matthews et al. |
| 9,106,769 B2 | 8/2015 | Kanode et al. |
| 9,191,803 B2 | 11/2015 | Patel et al. |
| 9,240,946 B2 | 1/2016 | Cai et al. |
| 9,374,840 B2 | 6/2016 | Monedero Recuero |
| 9,538,335 B1 | 1/2017 | Bank et al. |
| 9,628,994 B1 | 4/2017 | Gunyel et al. |
| 9,681,360 B1 | 6/2017 | Salyers et al. |
| 9,912,486 B1 | 3/2018 | Sharifi Mehr |
| 10,009,751 B2 | 6/2018 | Gundavelli et al. |
| 10,021,738 B1 | 7/2018 | Mehta et al. |
| 10,045,326 B2 | 8/2018 | Blanchard et al. |
| 10,168,413 B2 | 1/2019 | Annamalai et al. |
| 10,212,538 B2 | 2/2019 | Russell |
| 10,230,726 B2 | 3/2019 | Barkan |
| 10,237,721 B2 | 3/2019 | Gupta et al. |
| 10,306,459 B1 | 5/2019 | Patil et al. |
| 10,470,154 B2 | 11/2019 | Chellamani et al. |
| 10,511,998 B1 | 12/2019 | Vallur |
| 10,616,200 B2 | 4/2020 | Kumar et al. |
| 10,637,838 B1 | 4/2020 | Larios et al. |
| 10,652,850 B2 | 5/2020 | Landais et al. |
| 10,776,791 B2 | 9/2020 | Ferguson et al. |
| 10,834,045 B2 | 11/2020 | Mahalank et al. |
| 10,834,571 B1 | 11/2020 | Yau et al. |
| 10,931,668 B2 | 2/2021 | Mehta |
| 10,952,063 B2 | 3/2021 | Mehta |
| 10,984,128 B1 | 4/2021 | Hoffer |
| 11,050,788 B2 | 6/2021 | Livanos |
| 11,068,534 B1 | 7/2021 | Svendsen |
| 11,140,555 B2 | 10/2021 | Thai et al. |
| 11,265,695 B2 | 3/2022 | Shah et al. |
| 11,272,560 B1 | 3/2022 | Vivanco et al. |
| 11,368,839 B2 | 6/2022 | Targali |
| 11,411,925 B2 | 8/2022 | Kumar et al. |
| 11,516,671 B2 | 11/2022 | Rajput et al. |
| 11,528,251 B2 | 12/2022 | Rajput et al. |
| 11,553,342 B2 | 1/2023 | Mahalank et al. |
| 11,622,255 B2 | 4/2023 | Iddya et al. |
| 11,751,056 B2 | 9/2023 | Russell |
| 2001/0046856 A1 | 11/2001 | McCann |
| 2002/0080752 A1 | 6/2002 | Johansson et al. |
| 2002/0098856 A1 | 7/2002 | Berg et al. |
| 2002/0181448 A1 | 12/2002 | Uskela et al. |
| 2002/0193127 A1 | 12/2002 | Martschitsch |
| 2003/0087647 A1 | 5/2003 | Hurst |
| 2004/0140908 A1 | 7/2004 | Gladwin et al. |
| 2005/0182968 A1 | 8/2005 | Izatt et al. |
| 2005/0232236 A1 | 10/2005 | Allison et al. |
| 2006/0068762 A1 | 3/2006 | Baldwin et al. |
| 2006/0193258 A1 | 8/2006 | Ballai |
| 2006/0211406 A1 | 9/2006 | Szucs et al. |
| 2006/0242414 A1 | 10/2006 | Corson et al. |
| 2007/0011261 A1 | 1/2007 | Madams et al. |
| 2007/0165527 A1 | 7/2007 | Sultan et al. |
| 2007/0165626 A1 | 7/2007 | Sultan et al. |
| 2007/0174082 A1 | 7/2007 | Singh |
| 2007/0223372 A1 | 9/2007 | Haalen et al. |
| 2007/0248032 A1 | 10/2007 | Vasudevan et al. |
| 2007/0281718 A1 | 12/2007 | Nooren |
| 2008/0004047 A1 | 1/2008 | Hill et al. |
| 2008/0020704 A1 | 1/2008 | Costa |
| 2008/0026778 A1 | 1/2008 | Cai et al. |
| 2008/0045246 A1 | 2/2008 | Murtagh et al. |
| 2008/0051061 A1 | 2/2008 | Takahashi |
| 2008/0076430 A1 | 3/2008 | Olson |
| 2008/0125116 A1 | 5/2008 | Jiang |
| 2008/0168540 A1 | 7/2008 | Agarwal et al. |
| 2008/0207181 A1 | 8/2008 | Jiang |
| 2008/0222038 A1 | 9/2008 | Eden |
| 2008/0259798 A1 | 10/2008 | Loh et al. |
| 2009/0045251 A1 | 2/2009 | Jaiswal et al. |
| 2009/0168719 A1 | 7/2009 | Mercurio |
| 2009/0191915 A1 | 7/2009 | Abramson et al. |
| 2009/0195349 A1 | 8/2009 | Frader-Thompson et al. |
| 2010/0062789 A1 | 3/2010 | Agarwal et al. |
| 2010/0098414 A1 | 4/2010 | Kramer et al. |
| 2010/0100958 A1 | 4/2010 | Jeremiah |
| 2010/0105355 A1 | 4/2010 | Nooren |
| 2010/0130227 A1 | 5/2010 | Farthofer et al. |
| 2010/0161817 A1 | 6/2010 | Xiao et al. |
| 2010/0223222 A1 | 9/2010 | Zhou et al. |
| 2010/0235911 A1 | 9/2010 | Nooren |
| 2010/0240361 A1 | 9/2010 | Jiang |
| 2010/0313024 A1 | 12/2010 | Weniger et al. |
| 2011/0009085 A1 | 1/2011 | Albanes et al. |
| 2011/0014939 A1 | 1/2011 | Ravishankar et al. |
| 2011/0029655 A1 | 2/2011 | Forbes, Jr. et al. |
| 2011/0063126 A1 | 3/2011 | Kennedy et al. |
| 2011/0124317 A1 | 5/2011 | Joo |
| 2011/0124334 A1 | 5/2011 | Brisebois et al. |
| 2011/0158090 A1 | 6/2011 | Riley et al. |
| 2011/0173122 A1 | 7/2011 | Singhal |
| 2011/0191835 A1 | 8/2011 | Hawkes et al. |
| 2011/0217979 A1 | 9/2011 | Nas |
| 2011/0225091 A1 | 9/2011 | Plastina et al. |
| 2011/0246178 A1 | 10/2011 | Arzelier |
| 2011/0307381 A1 | 12/2011 | Kim et al. |
| 2012/0099715 A1 | 4/2012 | Ravishankar et al. |
| 2012/0110637 A1* | 5/2012 | Holtmanns ......... H04W 12/084 726/1 |
| 2012/0115512 A1 | 5/2012 | Grainger et al. |
| 2012/0131121 A1 | 5/2012 | Snyder et al. |
| 2012/0202481 A1 | 8/2012 | Martin |
| 2012/0203663 A1 | 8/2012 | Sinclair et al. |
| 2012/0207015 A1 | 8/2012 | Marsico |
| 2013/0035118 A1 | 2/2013 | Hamano et al. |
| 2013/0102231 A1 | 4/2013 | Joseph et al. |
| 2013/0102310 A1 | 4/2013 | Malonda |
| 2013/0171988 A1 | 7/2013 | Yeung et al. |
| 2013/0276035 A1 | 10/2013 | Walker et al. |
| 2013/0331063 A1 | 12/2013 | Cormier et al. |
| 2014/0195630 A1 | 7/2014 | Malik et al. |
| 2014/0199961 A1 | 7/2014 | Mohammed et al. |
| 2014/0199996 A1 | 7/2014 | Wang et al. |
| 2014/0259012 A1 | 9/2014 | Nandlall et al. |
| 2014/0280645 A1 | 9/2014 | Shuman et al. |
| 2014/0370922 A1 | 12/2014 | Richards |
| 2014/0378129 A1 | 12/2014 | Jiang et al. |
| 2015/0012415 A1 | 1/2015 | Livne et al. |
| 2015/0038156 A1 | 2/2015 | Kilpatrick, II et al. |
| 2015/0081579 A1 | 3/2015 | Brown et al. |
| 2015/0094060 A1 | 4/2015 | Kouridakis et al. |
| 2015/0119092 A1 | 4/2015 | Yi et al. |
| 2015/0121078 A1 | 4/2015 | Fu et al. |
| 2015/0188979 A1 | 7/2015 | Almeras et al. |
| 2015/0244486 A1 | 8/2015 | Liang et al. |
| 2015/0304220 A1 | 10/2015 | Miyao |
| 2015/0304803 A1 | 10/2015 | Chen et al. |
| 2015/0341341 A1 | 11/2015 | Messerges |

(56) References Cited

U.S. PATENT DOCUMENTS

| | | |
|---|---|---|
| 2015/0350196 A1 | 12/2015 | Toyonaga et al. |
| 2016/0088461 A1 | 3/2016 | Jiang |
| 2016/0119773 A1 | 4/2016 | Xu et al. |
| 2016/0156647 A1 | 6/2016 | Engel et al. |
| 2016/0165432 A1 | 6/2016 | Dubesset et al. |
| 2016/0183117 A1 | 6/2016 | Hsu et al. |
| 2016/0183178 A1 | 6/2016 | Marimuthu |
| 2016/0219043 A1 | 7/2016 | Blanke |
| 2016/0234119 A1 | 8/2016 | Zaidi et al. |
| 2016/0269566 A1 | 9/2016 | Gundamaraju et al. |
| 2016/0292687 A1 | 10/2016 | Kruglick |
| 2016/0337976 A1 | 11/2016 | Wang et al. |
| 2016/0365983 A1 | 12/2016 | Shahabuddin et al. |
| 2016/0381699 A1 | 12/2016 | Rubin et al. |
| 2017/0006431 A1 | 1/2017 | Donovan et al. |
| 2017/0142547 A1 | 5/2017 | Hou et al. |
| 2017/0201778 A1 | 7/2017 | Bailey et al. |
| 2017/0244676 A1 | 8/2017 | Edwards |
| 2017/0245207 A1 | 8/2017 | Stammers et al. |
| 2017/0245280 A1 | 8/2017 | Yi et al. |
| 2017/0257866 A1 | 9/2017 | Chaudhuri et al. |
| 2017/0272921 A1 | 9/2017 | Kim et al. |
| 2017/0289048 A1 | 10/2017 | Chao et al. |
| 2017/0295201 A1 | 10/2017 | Peylo et al. |
| 2017/0345006 A1 | 11/2017 | Kohli |
| 2017/0366499 A1 | 12/2017 | De Boer et al. |
| 2018/0020324 A1 | 1/2018 | Beauford |
| 2018/0109632 A1 | 4/2018 | Stammers et al. |
| 2018/0109953 A1 | 4/2018 | He |
| 2018/0115970 A1 | 4/2018 | Chae et al. |
| 2018/0167906 A1 | 6/2018 | Chellamani et al. |
| 2018/0205698 A1 | 7/2018 | Gupta et al. |
| 2018/0220301 A1 | 8/2018 | Gallagher et al. |
| 2018/0270765 A1 | 9/2018 | Wang |
| 2018/0288127 A1 | 10/2018 | Zaidi et al. |
| 2018/0288198 A1 | 10/2018 | Pope et al. |
| 2018/0310162 A1 | 10/2018 | Kim et al. |
| 2019/0007788 A1 | 1/2019 | Russell |
| 2019/0037484 A1 | 1/2019 | Davies et al. |
| 2019/0044932 A1 | 2/2019 | Kumar et al. |
| 2019/0074982 A1 | 3/2019 | Hughes |
| 2019/0090086 A1 | 3/2019 | Graham et al. |
| 2019/0116624 A1 | 4/2019 | Tandon et al. |
| 2019/0182875 A1 | 6/2019 | Talebi Fard et al. |
| 2019/0253885 A1 | 8/2019 | Bykampadi et al. |
| 2019/0306166 A1 | 10/2019 | Konda et al. |
| 2019/0342217 A1 | 11/2019 | Mazurek |
| 2019/0354709 A1 | 11/2019 | Brinskelle |
| 2019/0364064 A1 | 11/2019 | Gupta et al. |
| 2019/0364460 A1 | 11/2019 | Bogineni et al. |
| 2020/0007538 A1 | 1/2020 | Mehta |
| 2020/0036754 A1 | 1/2020 | Livanos |
| 2020/0042799 A1 | 2/2020 | Huang et al. |
| 2020/0053044 A1 | 2/2020 | Mahalank et al. |
| 2020/0077260 A1 | 3/2020 | Hancock et al. |
| 2020/0107291 A1 | 4/2020 | Nayak et al. |
| 2020/0145432 A1 | 5/2020 | Verma et al. |
| 2020/0169510 A1 | 5/2020 | Kadosh et al. |
| 2020/0187089 A1 | 6/2020 | Meredith et al. |
| 2020/0221541 A1 | 7/2020 | Yan |
| 2020/0259896 A1 | 8/2020 | Sachs et al. |
| 2020/0329363 A1 | 10/2020 | Mehta |
| 2020/0344604 A1* | 10/2020 | He ...................... H04W 12/088 |
| 2020/0359218 A1* | 11/2020 | Lee ...................... H04M 15/55 |
| 2020/0404490 A1 | 12/2020 | Thai et al. |
| 2021/0022070 A1 | 1/2021 | Letor et al. |
| 2021/0111985 A1 | 4/2021 | Mahalank et al. |
| 2021/0112012 A1 | 4/2021 | Krishan et al. |
| 2021/0142143 A1 | 5/2021 | Howard |
| 2021/0152494 A1 | 5/2021 | Johnsen et al. |
| 2021/0168751 A1 | 6/2021 | Stojanovski et al. |
| 2021/0176177 A1 | 6/2021 | Kubo et al. |
| 2021/0194903 A1 | 6/2021 | Medvedovsky et al. |
| 2021/0203636 A1 | 7/2021 | Kumar et al. |
| 2021/0203643 A1 | 7/2021 | Jost et al. |
| 2021/0211946 A1 | 7/2021 | Li |
| 2021/0234706 A1 | 7/2021 | Nair et al. |
| 2021/0243165 A1 | 8/2021 | Bykampadi et al. |
| 2021/0250186 A1 | 8/2021 | Bykampadi et al. |
| 2021/0258824 A1 | 8/2021 | John et al. |
| 2021/0274436 A1 | 9/2021 | Sun et al. |
| 2021/0297942 A1 | 9/2021 | Bykampadi et al. |
| 2021/0321303 A1 | 10/2021 | Nair et al. |
| 2021/0377138 A1 | 12/2021 | Sun et al. |
| 2021/0377212 A1 | 12/2021 | Holtmanns et al. |
| 2021/0399988 A1 | 12/2021 | Labonte |
| 2021/0400538 A1 | 12/2021 | Ke |
| 2021/0406038 A1 | 12/2021 | Fetzer et al. |
| 2022/0021586 A1 | 1/2022 | Kazmierski |
| 2022/0022027 A1 | 1/2022 | Xin et al. |
| 2022/0022040 A1 | 1/2022 | Mahalank et al. |
| 2022/0030413 A1 | 1/2022 | Ben Henda et al. |
| 2022/0038394 A1 | 2/2022 | Anubolu et al. |
| 2022/0052847 A1 | 2/2022 | Gonzalez Cervantes et al. |
| 2022/0070674 A1 | 3/2022 | Russell |
| 2022/0104020 A1 | 3/2022 | Rajput |
| 2022/0104112 A1 | 3/2022 | Rajput |
| 2022/0124079 A1* | 4/2022 | Patil ...................... H04W 12/72 |
| 2022/0124479 A1 | 4/2022 | Iddya |
| 2022/0124501 A1 | 4/2022 | Bykampadi et al. |
| 2022/0150212 A1 | 5/2022 | Rajput |
| 2022/0158847 A1 | 5/2022 | Aggarwal et al. |
| 2022/0159445 A1 | 5/2022 | Rajavelu |
| 2022/0174544 A1 | 6/2022 | Taft et al. |
| 2022/0182923 A1 | 6/2022 | Yao et al. |
| 2022/0191763 A1 | 6/2022 | Roeland et al. |
| 2022/0200951 A1 | 6/2022 | Goel |
| 2022/0200966 A1 | 6/2022 | De-Gregorio-Rodriguez et al. |
| 2022/0201489 A1 | 6/2022 | Mahalank |
| 2022/0240084 A1 | 7/2022 | Speidel et al. |
| 2022/0256312 A1 | 8/2022 | Kim et al. |
| 2022/0264260 A1 | 8/2022 | Chaurasia et al. |
| 2022/0272069 A1 | 8/2022 | Verma et al. |
| 2022/0272541 A1 | 8/2022 | Rajput et al. |
| 2022/0369091 A1 | 11/2022 | Nair |

FOREIGN PATENT DOCUMENTS

| | | |
|---|---|---|
| CN | 101742445 A | 6/2010 |
| CN | 101917698 A | 12/2010 |
| CN | 102656845 A | 9/2012 |
| CN | 103179504 A | 6/2013 |
| CN | 103444212 A | 12/2013 |
| CN | 107800664 A | 3/2018 |
| CN | 108307385 A | 7/2018 |
| CN | 110035433 A | 7/2019 |
| CN | 110800322 B | 5/2021 |
| EP | 1 067 492 A2 | 1/2001 |
| EP | 1 906 682 A1 | 4/2008 |
| EP | 2 204 955 A1 | 7/2010 |
| EP | 2 785 125 B1 | 8/2018 |
| EP | 3 493 569 A1 | 6/2019 |
| EP | 3 646 630 B1 | 8/2021 |
| EP | 3 662 630 | 8/2021 |
| EP | 3954146 A1 | 2/2022 |
| EP | 3 821 630 B1 | 7/2022 |
| EP | 4183154 | 5/2023 |
| EP | 3954146 B1 | 6/2023 |
| EP | 4233275 A1 | 8/2023 |
| ES | 2 548 005 T3 | 10/2015 |
| IN | 401247 | 7/2022 |
| JP | 2008-053808 A | 3/2008 |
| JP | 7038148 B2 | 3/2022 |
| JP | 7113147 B | 8/2022 |
| JP | 7133010 B2 | 9/2022 |
| JP | 7198339 B | 12/2022 |
| JP | 7234342 B2 | 3/2023 |
| JP | 7246418 B2 | 3/2023 |
| WO | WO 01/88790 A1 | 11/2001 |
| WO | WO 2005/091656 A1 | 9/2005 |
| WO | WO 2005/101872 A1 | 10/2005 |
| WO | WO 2007/084503 A2 | 7/2007 |
| WO | WO 2008/053808 A1 | 5/2008 |
| WO | WO-2010/021886 A1 | 2/2010 |

(56) References Cited

FOREIGN PATENT DOCUMENTS

| | | | |
|---|---|---|---|
| WO | WO 2010/045646 A2 | 4/2010 | |
| WO | WO 2010/105099 A2 | 9/2010 | |
| WO | WO 2011/010640 A1 | 1/2011 | |
| WO | WO 2011/047382 A2 | 4/2011 | |
| WO | WO 2016/201990 A1 | 12/2016 | |
| WO | WO 2017/082532 A1 | 5/2017 | |
| WO | WO 2018/202284 A1 | 11/2018 | |
| WO | WO 2019/005287 A1 | 1/2019 | |
| WO | WO 2019/027813 A1 | 2/2019 | |
| WO | WO-2019158028 A1 * | 8/2019 | |
| WO | WO 2019/224157 A1 | 11/2019 | |
| WO | WO 2020/013889 A1 | 1/2020 | |
| WO | WO 2020/033113 A1 | 2/2020 | |
| WO | WO 2020/036883 A1 | 2/2020 | |
| WO | WO 2020/164763 A1 | 8/2020 | |
| WO | WO 2020/179665 A1 | 9/2020 | |
| WO | WO-2020174121 A1 * | 9/2020 | |
| WO | WO 2020/210015 A1 | 10/2020 | |
| WO | WO 2020/257018 A1 | 12/2020 | |
| WO | WO 2021/138072 A1 | 7/2021 | |
| WO | WO 2022/015378 A1 | 1/2022 | |
| WO | WO 2022/046176 A1 | 3/2022 | |
| WO | WO 2022/066227 | 3/2022 | |
| WO | WO 2022/066228 A1 | 3/2022 | |
| WO | WO 2022/086596 A1 | 4/2022 | |
| WO | WO 2022/098404 A1 | 5/2022 | |
| WO | WO 2022/103454 A1 | 5/2022 | |
| WO | WO 2022/132315 A1 | 6/2022 | |
| WO | WO 2022/132316 A1 | 6/2022 | |
| WO | WO 2022/182448 A1 | 9/2022 | |
| ZA | L201880040478.3 | 4/2022 | |
| ZA | L202080007649.X | 9/2022 | |

OTHER PUBLICATIONS

Decision to grant a European patent pursuant to Article 97(1) EPC for European Patent Application Serial No. 19710842.6 (dated Jun. 30, 2022).

Notice of Allowance for Chinese Application Serial No. 202080007649.X (dated Jun. 20, 2022).

Communication under Rule 71(3) EPC Intention to Grant for European Patent Application Serial No. 19 749 059.2 (May 16, 2022).

Notification of Transmittal of the International Search Report and the Written Opinion of the International Searching Authority, or the Declaration for International Application No. PCT/US2021/042853 (dated Oct. 18, 2021).

Advisory Action and Applicant-Initiated Interview Summary for U.S. Appl. No. 17/099,683 (dated May 23, 2022).

Notification of Transmittal of the International Search Report and the Written Opinion of the International Searching Authority, or the Declaration for International Application No. PCT/US2022/013373 (dated Apr. 11, 2022).

Non-Final Office Action and Examiner Interview Summary for U.S. Appl. No. 16/929,048 (dated Apr. 14, 2022).

Notice of Allowance for U.S. Appl. No. 16/732,098 (dated Apr. 6, 2022).

Examination Report for Indian Application Serial No. 202147030053 (dated Mar. 22, 2022).

Notification of Transmittal of the International Search Report and the Written Opinion of the International Searching Authority or the Declaration for International Application No. PCT/US2021/057156 (dated Mar. 3, 2022).

Non-Final Office Action for Chinese Application Serial No. 202080007649.X (dated Mar. 2, 2022).

Non-Final Office Action for U.S. Appl. No. 17/076,482 (dated Apr. 1, 2022).

Nokia et al., "Support of the mapping from IP addressing information provided to an AF to the user identity," 3GPP SA WG2 Meeting #142e pp. 1-3 (Nov. 16-20, 2020).

China Telecom, "KI #13, New Sol: Trigger Procedures for Requesting Analytics," 3GPP SA WG2 Meeting #S2-139E pp. 1-4 (Aug. 19-Sep. 2, 2020).

First Office Action for Japanese Application Serial No. 2021545918 (dated Mar. 8, 2022).

Non-Final Office Action for U.S. Appl. No. 17/129,487 (dated Mar. 21, 2022).

Intention to grant a European patent pursuant to Article 97(1) EPC for European Patent Application Serial No. 19710842.6 (dated Feb. 24, 2022).

Notice of Allowance for Chinese Application Serial No. 201880040478.3 (dated Feb. 28, 2022).

Notice of Allowance for Japanese Application Serial No. 2019572174 (dated Feb. 8, 2022).

Final Office Action for U.S. Appl. No. 17/099,683 (dated Feb. 15, 2022).

Notification of Transmittal of the International Search Report and the Written Opinion of the International Searching Authority, or the Declaration for International Application No. PCT/US2021/057157 (dated Jan. 27, 2022).

Notification Concerning Availability of the Publication of the International Application for International Application No. PCT/US2021/024002 (dated Jan. 20, 2022).

Examination Report for Indian Application Serial No. 202147005810 (dated Jan. 24, 2022).

Examination Report for Indian Application Serial No. 202147001641 (dated Jan. 13, 2022).

Examination Report for Indian Application Serial No. 202047056970 (dated Jan. 13, 2022).

Commonly-assigned, co-pending U.S. Appl. No. 17/319,023 for "Methods, Systems, and Computer Readable Media for Conducting a Velocity Check for Outbound Subscribers Roaming to Neighboring Countries," (Unpublished, May 12, 2021).

Nokia et al., "3gpp-Sbi-Consumer-Id," 3GPP TSG-CT WG4 Meeting #101e pp. 1-4 (Nov. 3-13, 2020).

Nokia et al., "SBA Network Function certificate profile," 3GPTT TSG-SA WG3 Meeting #98e pp. 1-5 (Mar. 2-6, 2020).

"3rd Generarion Partnership Project; Technical Specification Group Services and System Aspects; Security Aspects; Study on security aspects of the 5G Service Based Architecture (SBA) (Release 16)," 3GPP TR 33.855, V1.3.0 pp. 1-52 (Nov. 2018).

Notification of Transmittal of the International Search Report and the Written Opinion of the International Searching Authority, or the Declaration for International Application No. PCT/US2021/042660 (dated Oct. 26, 2021).

Hearing Notice of Indian Application Serial No. 201947047367 (dated Oct. 11, 2021).

First Office Action for Japanese Application Serial No. 2019572174 (dated Sep. 14, 2021).

Notification of Transmittal of the International Search Report and the Written Opinion of the International Searching Authority, or the Declaration for International Application No. PCT/US2021/033030 (dated Aug. 20, 2021).

First Office Action for Chinese Application Serial No. 201880040478.3 (dated Aug. 26, 2021).

Notification Concerning Availability of the Publication of the International Application for International Application No. PCT/US2020/065763 (dated Jul. 8, 2021).

Non-Final Office Action for U.S. Appl. No. 17/099,683 (dated Sep. 20, 2021).

Decision to grant a European patent pursuant to Article 97(1) EPC for European Patent Application Serial No. 18756018.0 (dated Jul. 29, 2021).

Decision to grant a European patent pursuant to Article 97(1) EPC for European Patent Application Serial No. 18731923.1 (dated Jul. 15, 2021).

Notification of Transmittal of the International Search Report and the Written Opinion of the International Searching Authority, or the Declaration for International Application No. PCT/US2021/029977 (dated Jul. 9, 2021).

(56) References Cited

OTHER PUBLICATIONS

Notification of Transmittal of the International Search Report and the Written Opinion of the International Searching Authority, or the Declaration for International Application No. PCT/US2021/029973 (dated Jul. 7, 2021).
Notification of Transmittal of the International Search Report and the Written Opinion of the International Searching Authority, or the Declaration for International Application No. PCT/US2021/024002 (dated Jun. 29, 2021).
Notification of Transmittal of the International Search Report and the Written Opinion of the International Searching Authority, or the Declaration for International Application No. PCT/US2021/024980 (dated Jun. 23, 2021).
Communication of European publication number and information on the application of Article 67(3) EPC for European Patent Application Serial No. 19710842.6 (dated Apr. 21, 2021).
"3rd Generation Partnership Project; Technical Specification Group Services and System Aspects; Security Aspects; Study on security aspects of the 5G Service based Architecture (SBA) (Release 16)," 3GPP TR 33.855, V16.0.0, pp. 1-104 (Jul. 2020).
"3rd Generation Partnership Project; Technical Specification Group Services and System Aspects; Security Assurance Specification (SCAS) threats and critical assets in 3GPP network product classes (Release 16)," 3GPP TR 33.926, V16.3.0, pp. 1-60 (Mar. 2020).
"New Annex for the SEPP in TR 33.926," 3GPP TSG-SA WG3 Meeting #95-BIS, pp. 1-6 (Jun. 24-28, 2019).
"5G; Procedures for the 5G System (3GPP TS 23.502 version 15.3.0 Release 15)," ETSI TS 123 502, V15.3.0, pp. 1-330 (Sep. 2018).
"N32 message anti-spoofing within the SEPP," 3GPP TSG SA WG3 (Security), Meeting #91, pp. 1-2 (Apr. 16-20, 2018).
"Edge Router (DEA)," Mavenir, pp. 1-7 (2017).
Press Release, "Echelon and T-Mobile Announce Alliance to Reduce the Cost of a Secure Smart Grid Network for Utilities," Echelon Corp., https://www.tdworld.com/smart-utility/article/20956244/echelon-and-tmobile-announce-to-reduce-the-cost-of-a-secure-smart-grid-network-for-utilities, p. 1-10 (Mar 14, 2009).
"3rd Generation Partnership Project; Technical Specification Group Core Network and Terminals; Numbering, addressing and identification; (Release 16)," 3GPP TS 23.003, V16.4.0, pp. 1-141 (Sep. 2020).
"3rd Generation Partnership Project; Technical Specification Group Core Network and Terminals; 5G System; Network Function Repository Services; Stage 3 (Release 16)," 3GPP TS 29.510, V16.5.0, pp. 1-208 (Sep. 2020).
"3rd Generation Partnership Project; Technical Specification Group Core Network and Terminals; 5G System; Authentication Server Services; Stage 3 (Release 16)," 3GPP TS 29,509, V16.5.0 pp. 1-60 (Sep. 2020).
"3rd Generation Partnership Project; Technical Specification Group Core Network and Terminals; 5G System; Public Land Mobile Network (PLMN) Interconnection; Stage 3 (Release 16)," 3GPP TS 29.573, V16.4.0, pp. 1-95 (Sep. 2020).
"3rd Generation Partnership Project; Technical Specification Group Serivvces and System Aspects; Security architecture and procedures for 5G system (Release 16)," 3GPP TS 33.501, V16.4.0, pp. 1-249 (Sep. 2020).
Notification of reasons for refusal for Japanese Patent Application No. 2020-572898 (dated Oct. 25, 2022).
Advisory Action for U.S. Appl. No. 17/076,482 (dated Oct. 25, 2022).
Final Office Action and Applicant-Initiated Interview Summary for U.S. Appl. No. 17/099,683 (dated Oct. 24, 2022).
Communication of European publication number and information on the application of Article 67(3) EPC for European Patent Application No. 20842462.2 (dated Oct. 12, 2022).
Decision to grant a European patent pursuant to Article 97(1) EPC for European Patent Application Serial No. 19749059.2 (dated Sep. 29, 2022).
Decision to Grant for Japanese Patent Application Serial No. 2020-505462 (dated Aug. 2, 2022).

Non-Final Office Action for U.S. Appl. No. 17/319,023 (dated Sep. 28, 2022).
Communication of European publication number and information on the application of Article 67(3) EPC for European Patent Application Serial No. 20720580.8 (dated Jan. 19, 2022).
Non-Final Office Action for U.S. Appl. No. 17/175,260 (dated Aug. 29, 2022).
Notice of Allowance and Fee(s) Due and Examiner-Initiated Interview Summary for U.S. Appl. No. 16/929,048 (dated Aug. 24, 2022).
Notification of Transmittal of the International Search Report and the Written Opinion of the International Searching Authority or the Declaration for International Application No. PCT/US2022/026415 (dated Aug. 12, 2022).
Notice to Grant for Japanese Patent Application Serial No. 2021-545918 (dated Jun. 28, 2022).
"5G; Policy and Charging Control signaling flows and parameter mapping (3GPP TS 29.513 version 15.6.0 Release 15)," ETSI TS 129 513, V15.6.0, pp. 1-92 (Jan. 2020).
Final Office Action for U.S. Appl. No. 17/076,482 (dated Aug. 5, 2022).
Notice of Allowance and Fee(s) Due and Examiner-Initiated Interview Summary for U.S. Appl. No. 17/129,487 (dated Jul. 25, 2022).
Notice of Allowance and Fee(s) Due and Examiner-Initiated Interview Summary for U.S. Appl. No. 17/185,934 (dated Jul. 21, 2022).
Communication of European publication number and information on the application of Article 67(3) EPC for European Patent Application Serial No. 19730571.7 (dated Apr. 8, 2021).
International Search Report for International Patent Application Serial No. PCT/US2020/065763 (dated Apr. 6, 2021).
First Examination Report for Indian Patent Application Serial No. 201947047367 (dated Mar. 31, 2021).
Notice of Allowance for Chinese Patent Application Serial No. 201880040477.9 (dated Mar. 29, 2021).
Communication under Rule 71(3) EPC Intention to Grant for European Patent Application Serial No. 18 731 923.1 (dated Mar. 22, 2021).
First Examination Report for Indian Patent Application Serial No. 201947047012 (dated Mar. 18, 2021).
Commonly-assigned, co-pending U.S. Appl. No. 17/185,934 for "Methods, Systems, and Computer Readable Media for Mitigating Location Tracking and Denial of Service (DoS) Attacks that Utilize Access And Mobility Management Function (AMF) Location Service," (Unpublished, filed Feb. 25, 2021).
Communication under Rule 71(3) EPC Intention to grant for European Application Serial No. 18 756 018.0 (dated Feb. 24, 2021).
Commonly-assigned, co-pending U.S. Appl. No. 17/175,260 for "Methods, Systems, and Computer Readable Media for Short Message Delivery Status Report Validation," (Unpublished, filed Feb. 12, 2021).
"3rd Generation Partnership Project; Technical Specification Group Services and System Aspects; Service requirements for the 5G system; Stage 1 (Release 18)," 3GPP TS 22.261, V18.1.1, pp. 1-85 (Jan. 2021).
"3rd Generation Partnership Project; Technical Specification Group Services and System Aspects; Procedures for the 5G System (5GS); Stage 2 (Release 16)," 3GPP TS 23.502, V16.7.1, pp. 1-603 (Jan. 2021).
Fajardo, V. et al., "Diameter Base Protocol, Internet Engineering Task Force (IETF)," RFC 6733, pp. 1-152 (Oct. 2012).
"3rd Generation Partnership Project; Technical Specification Group Core Network and Terminals; Numbering, addressing and identification; (Release 17)," 3GPP TS 23.003, V17.0.0, pp. 1-142 (Dec. 2020).
"3rd Generation Partnership Project; Technical Specification Group Services and System Aspects; Wireless and wireline convergence access support for the 5G System (5GS) (Release 16)," 3GPP TS 23.316, V16.6.0, pp. 1-83 (Dec. 2020).
"3rd Generation Partnership Project; Technical Specification Group Services and System Aspects; Security architecture and procedures for 5G system (Release 17)," 3GPP TS 33.501, V17.0.0, pp. 1-253 (Dec. 2020).

(56) References Cited

OTHER PUBLICATIONS

"3rd Generation Partnership Project; Technical Specification Group Core Network and Terminals; 5G System; Common Data Types for Service Based Interfaces; Stage 3 (Release 17)," 3GPP TS 29.571, V17.0.0, pp. 1-128 (Dec. 2020).

"3rd Generation Partnership Project; Technical Specification Group Core Network and Terminals; 5G System; Public Land Mobile Network (PLMN) Interconnection; Stage 3 (Release 16)," 3GPP TS 29.573, V16.5.0, pp. 1-98 (Dec. 2020).

"3rd Generation Partnership Project; Technical Specification Group Core Network and Terminals; 5G System; Location Management Services; Stage 3 (Release 16)," 3GPP TS 29.572, V16.5.0, pp. 1-77 (Dec. 2020).

"3rd Generation Partnership Project; Technical Specification Group Core Network and Terminals; 5G System; Access and Mobility Management Services; Stage 3 (Release 17)," 3GPP TS 29.518, V17.0.0, pp. 1-298 (Dec. 2020).

"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).

Commonly-assigned, co-pending U.S. Appl. No. 17/129,441 for "Methods Systems, and Computer Readable Media for Mitigating Spoofing Attacks on Security Edge Protection Proxy (SEPP) Inter-Public Land Mobile Network (INTER-PLMN) Forwarding Interface," (Unpublished, filed Dec. 21, 2020).

Commonly-assigned, co-pending U.S. Appl. No. 17/129,487 for "Methods, Systems, and Computer Readable Media for Ingress Message Rate Limiting," (Unpublished, filed Dec. 21, 2020).

Commonly-assigned, co-pending U.S. Appl. No. 17/125,943 for "Methods Systems, and Computer Readable Media for Mitigating 5G Roaming Attacks for Internet of Things (IoT) Devices Based on Expected User Equipment (UE) Behavior Patterns," (Unpublished, filed Dec. 17, 2020).

"3rd Generation Partnership Project; Technical Specification Group Core Network and Terminals; 5G System; Network Function Repository Services; Stage 3 (Release 17)," 3GPP TS 29.510, V17.0.0, pp. 1-229 (Dec. 2020).

Commonly-assigned, co-pending U.S. Appl. No. 17/099,683 for "Methods, Systems, and Computer Readable Media for Validating Location Update Messages," (Unpublished, filed Nov. 16, 2020).

Commonly-assigned, co-pending U.S. Appl. No. 17/095,420 for "Methods, Systems, and Computer Readable Media for Mitigating 5G Roaming Spoofing Attacks," (Unpublished, filed Nov. 11, 2020).

SMS Test Numbers: SMS Fake Delivery Receipts, Fake DLR—Tel!—SMS Test Platform and SMS services, Nov. 6, 2020, pp. 1-6, https://telqtele.com/sms-fake-delivery-receipts-fake-dlr/.

Notice of Allowance and Fee(s) Due and Examiner-Initiated Interview Summary for U.S. Appl. No. 16/379,488 (dated Oct. 23, 2020).

Commonly-assigned, co-pending U.S. Appl. No. 17/076,482 for "Methods, Systems, and Computer Readable Media for Validating a Session Management Function (SMF) Registration Request," (Unpublished, filed Oct. 21, 2020).

Notice of Allowance and Fee(s) Due and Examiner-Initiated Interview Summary for U.S. Appl. No. 16/024,422 (dated Oct. 21, 2020).

"3rd Generation Partnership Project; Technical Specification Group Core Network and Terminals; 5G System; Session Management Services; Stage 3 (Release 16)," 3GPP TS 29.502, V16.5.0, pp. 1-260 (Sep. 2020).

"3rd Generation Partnership Project; Technical Specification Group Services and System Aspects; System architecture for the 5G System (5GS); Stage 2 (Release 16)," 3GPP TS 23.501, V16.6.0, pp. 1-447 (Sep. 2020).

3rd Generation Partnership Project; Technical Specification Group Services and System Aspects; Procedures for the 5G System (5GS); Stage 2 (Release 16), 3GPP TS 23.502, V16.6.0, pp. 1-597 (Sep. 2020).

Notice of Allowance and Fee(s) Due and Examiner-Initiated Interview Summary for U.S. Appl. No. 16/100,172 (dated Sep. 14, 2020).

Commonly-assigned, co-pending U.S. Appl. No. 17/008,528 for "Methods, Systems, and Computer Readable Media for 5G User Equipment (UE) Historical Mobility Tracking and Security Screening Using Mobility Patterns," (Unpublished, filed Aug. 31, 2020).

First Office Action for Chinese Application Serial No. 201880040477.9 (dated Aug. 5, 2020).

"3rd Generation Partnership Project; Technical Specification Group Services and System Aspects; System architecture for the 5G System (5GS); Stage 2 (Release 16)," 3GPP TS 23.501 V16.5.1, pp. 1-440 (Aug. 2020).

"3rd Generation Partnership Project; Technical Specification Group Core Network and Terminals; 5G System; Network Function Repository Services; Stage 3 (Release 16)," 3GPP TS 29.510, V16.4.0, pp. 1-206 (Jul. 2020).

Notification of Transmittal of the International Search Report and the Written Opinion of the International Searching Authority, or the Declaration for International Application No. PCT/US2020/024234 (dated Jul. 16, 2020).

Non-Final Office Action for U.S. Appl. No. 16/379,488 (dated Jul. 15, 2020).

Commonly-assigned, co-pending U.S. Appl. No. 16/929,048 for "Methods, Systems, and Computer Readable Media for Mitigating 5G Roaming Security Attacks Using Security Edge Protection Proxy (SEPP)," (Unpublished, filed Jul. 14, 2020).

"3rd Generation Partnership Project; Technical Specification Group Services and System Aspects; Architecture enhancements for 5G System (5GS) to support network data analytics services (Release 16)," 3GPP TS 23.288 V16.4.0, pp. 1-66 (Jul. 2020).

"3rd Generation Partnership Project; Technical Specification Group Core Network and Terminals; 5G System; Public Land Mobile Network (PLMN) Interconnection; Stage 3 (Release 16)," 3GPP TS 29.573, V16.3.0, pp. 1-86 (Jul. 2020).

"3rd Generation Partnership Project; Technical Specification Group Services and System Aspects; Security architecture and procedures for 5G system (Release 16)," 3GPP TS 33.501, V16.3.0, pp. 1-248 (Jul. 2020).

Non-Final Office Action for U.S. Appl. No. 16/024,422 (dated Jul. 8, 2020)

"3rd Generation Partnership Project; Technical Specification Group Core Network and Terminals; 5G System; Network Function Repository Services; Stage 3 (Release 16)," 3GPP TS 29.510, V16.4.0, pp. 1-192 (Jul. 2020).

Applicant-Initiated Interview Summary for U.S. Appl. No. 16/100,172 (dated Jun. 9, 2020).

"3rd Generation Partnership Project; Technical Specification Group Core Network and Terminals; 5G System; Technical Realization of Service Based Architecture; Stage 3 (Release 16)," 3GPP TS 29.500 V16.4.0, pp. 1-79 (Jun. 2020).

"3rd Generation Partnership Project; Technical Specification Group Core Network and Terminals; 5G System; Network Data Analytics Services; Stage 3 (Release 16)," 3GPP TS 29.520 V16.4.0, pp. 1-91 (Jun. 2020).

Communication of European publication number and information on the application of Article 67(3) EPC for European Application Serial No. 18756018.0 (dated May 13, 2020).

Communication of European publication number and information on the application of Article 67(3) EPC for European Application Serial No. 18731923.1 (dated Apr. 8, 2020).

"3rd Generation Partnership Project; Technical Specification Group Services and System Aspects; Security architecture and procedures for 5G system (Release 16)," 3GPP TS 33.501, V16.2.0, pp. 1-227 (Mar. 2020).

"3rd Generation Partnership Project; Technical Specification Group Services and System Aspects; Procedures for the 5G System (5GS); Stage 2 (Release 16)," 3GPP TS 23.502, V16.4.0, pp. 1-582 (Mar. 2020).

Non-Final Office Action for U.S. Appl. No. 16/100,172 (dated Mar. 6, 2020).

Notice of Allowance and Fee(s) Due and Examiner-Initiated Interview Summary for U.S. Appl. No. 15/666,300 (dated Feb. 13, 2020).

Commonly-assigned, co-pending U.S. Appl. No. 16/732,098 for "Methods, Systems, and Computer Readable Media for Implement-

(56) References Cited

OTHER PUBLICATIONS ing Indirect General Packet Radio Service (GPRS) Tunneling Protocol (GTP) Firewall Filerting Using Diameter Agent and Signal Transfer Point (STP)," (Unpublished, filed Dec. 31, 2019).
Advisory Action and Applicant-Initiated Interview Summary for U.S. Appl. No. 16/100,172 (dated Dec. 20, 2019).
"3rd Generation Partnership Project; Technical Specification Group Services and System Aspects; 5G Security Assurance Specification (SCAS) for the Security Edge Protection Proxy (SEPP) network product class (Release 16)," 3GPP TS 33.517, V.16.1.0, pp. 1-17 (Dec. 2019).
3rd Generation Partnership Project; Technical Specification Group Core Network and Terminals; T8 reference point for Northbound APIs, (Release 15), 3GPP TS 29.122, V15.6.0, pp. 1-300 (Dec. 2019).
"FS.19 Diameter Interconnect Security," GSMA, pp. 1-3 (Dec. 20, 2019).
Notification of Transmittal of the International Search Report and the Written Opinion of the International Searching Authority, or the Declaration for International Application Serial No. PCT/US2019/042203 (dated Nov. 11, 2019).
Applicant-Initiated Interview Summary for U.S. Appl. No. 15/666,300 (dated Oct. 29, 2019).
Final Office Action for U.S. Appl. No. 16/100,172 (dated Oct. 3, 2019).
"Technical Specification Group Core Network and Terminals; Evolved Packet System (EPS); Mobility Management Entity (MME) and Serving GPRS Support Node (SGSN) related interfaces based on Diameter protocol (Release 16)," 3GPP TS 29.272, V16.0.0, pp. 1-180 (Sep. 2019).
"Technical Specification Group Core Network and Terminals; Policy and Charging Control (PCC); Reference points (Release 16)," 3GPP TS 29.212, V16.1.0, pp. 1-285 (Sep. 2019).
Notification of Transmittal of the International Search Report and the Written Opinion of the International Searching Authority, or the Declaration for International Application Serial No. PCT/US2019/028814 (dated Aug. 20, 2019).
Applicant-Initiated Interview Summary for U.S. Appl. No. 16/100,172 (dated Jul. 18, 2019).
Notice of Allowance and Fee(s) Due and Examiner-Initiated Interview Summary for U.S. Appl. No. 15/376,631 (dated Jul. 2, 2019).
"Technical Specification Group Core Network and Terminals; Mobile Application Part (MAP) specification (Release 15)," 3GPP TS 29.002, V15.5.0, pp. 1-1024 (Jun. 2019)
Non-Final Office Action for U.S. Appl. No. 15/666,300 (dated Jun. 27, 2019).
Decision on Appeal for U.S. Appl. No. 13/047,287 (dated Jun. 18, 2019).
Notification of Transmittal of the International Search Report and the Written Opinion of the International Searching Authority, or the Declaration for International Patent Application No. PCT/US2019/018990 (dated May 8, 2019).
Commonly-assigned, co-pending U.S. Appl. No. 16/379,488 for "Methods, Systems and Computer Readable Media for Dynamically Learning and Using Foreign Telecommunications Network Mobility Management Node Information for Security Screening," (Unpublished, filed Apr. 9, 2019).
Non-Final Office Action for U.S. Appl. No. 16/100,172 (dated Apr. 11, 2019).
Notice of Allowability for U.S. Appl. No. 16/035,008 (dated Mar. 18, 2019).
Notice of Allowance and Fee(s) Due for U.S. Appl. No. 16/035,008 (dated Jan. 18, 2019).
Advisory Action Before the Filing of an Appeal Brief and AFCP 2.0 Decision for U.S. Appl. No. 15/376,631 (dated Dec. 19, 2018).
Notice of Allowance and Fee(s) Due and Applicant-Initiated Interview Summary for U.S. Appl. No. 15/408,155 (dated Oct. 31, 2018).
Sahu et al., "How 5G Registration Works," http://5gblogs.com/5g-registration/, 10 pages (Oct. 12, 2018).

Notification of Transmittal of the International Search Report and the Written Opinion of the International Searching Authority, or the Declaration for International Patent Application No. PCT/US2018/043985 (dated Oct. 9, 2018).
Final Office Action for U.S. Appl. No. 15/376,631 (dated Oct. 5, 2018).
Notice of Allowance and Fee(s) Due for U.S. Appl. No. 15/636,118 (dated Oct. 3, 2018).
Notification of Transmittal of the International Search Report and the Written Opinion of the International Searching Authority, or the Declaration for International Application No. PCT/US2018/030319 (dated Aug. 20, 2018).
Commonly-assigned, co-pending U.S. Appl. No. 16/100,172 for "Methods, Systems, and Computer Readable Media for Conducting a Time Distance Security Countermeasure for Outbound Roaming Subscribers Using Diameter Edge Agent," (Unpublished, filed Aug. 9, 2018).
Final Office Action for U.S. Appl. No. 15/408,155 (dated Jul. 26, 2018).
Commonly-assigned, co-pending U.S. Appl. No. 16/035,008 for "Methods, Systems, and Computer Readable Media for Validating a Visitor Location Register (VLR) Using a Signaling System No. 7 (SS7) Signal Transfer Point (STP)," (Unpublished, filed Jul. 13, 2018).
Commonly-assigned, co-pending U.S. Appl. No. 16/024,422 for "Methods, Systems, and Computer Readable Media for Network Node Validation," (Unpublished, filed Jun. 29, 2018).
Notice of Allowance and Fee(s) Due for U.S. Appl. No. 15/636,118 (dated Apr. 27, 2018).
Non-Final Office Action for U.S. Appl. No. 15/376,631 (dated Apr. 18, 2018).
"Signalling Security in Telecom SS7/Diameter/5G," Enisa, pp. 1-30 (Mar. 2018).
Examiner's Answer for U.S. Appl. No. 13/047,287 (dated Feb. 26, 2018).
Advisory Action Before the Filing of an Appeal Brief and AFCP 2.0 Decision for U.S. Appl. No. 15/376,631 (dated Feb. 2, 2018).
Non-Final Office Action for U.S. Appl. No. 15/408,155 (dated Jan. 9, 2018).
Final Office Action for U.S. Appl. No. 15/376,631 (dated Nov. 28, 2017).
"GSMA Guidelines for Diameter Firewall," NetNumber Inc., pp. 1-7 (Sep. 12, 2017).
Commonly-assigned, co-pending U.S. Appl. No. 15/666,300 for "Methods, Systems, and Computer Readable Media for Mobility Management Entity (MME) Authentication for Outbound Roaming Subscribers Using Diameter Edge Agent (DEA)," (Unpublished, filed Aug. 1, 2017).
"Oracle Communications Diameter Signaling Router Main Differentiators," Oracle White Paper, pp. 1-10 (Jul. 2017).
"LTE and EPC Roaming Guidelines," GSM Association, Official Document IR.88, V 16.0, pp. 1-90 (Jul. 5, 2017).
Commonly-assigned, co-pending U.S. Appl. No. 15/636,118 for "Methods, Systems, and Computer Readable Media for Validating User Equipment (UE) Location," (Unpublished, filed Jun. 28, 2017).
Non-Final Office Action for U.S. Appl. No. 15/376,631 (dated Jun. 16, 2017).
"LTE International Roaming Whitepaper," http://carrier.huawei.com/en/technical-topics/core-network/lte-roaming-whitepaper, pp. 1-16 (Downloaded May 12, 2017).
"Digital cellular telecommunications system (Phase 2+) (GSM); Universal Mobile Telecommunications System (UMTS); Universal Geographical Area Description (GAD) (3GPP TS 23.032 V 14.0.0 Release 14)," ETSI TS 123 032 V14.0.0, pp. 1-30 (May 2017).
Final Office Action for U.S. Appl. No. 13/047,287 (dated Mar. 10, 2017).
"3rd Generation Partnership Project; Technical Specification Group Services and System Aspects; Functional stage 2 description of Location Services (LCS) (Release 14)," 3GPP TS 23.271 V14.1.0, pp. 1-181 (Mar. 2017).

(56) References Cited

OTHER PUBLICATIONS

Commonly-assigned, co-pending U.S. Appl. No. 15/408,155 for "Methods, Systems, and Computer Readable Media for Validating a Redirect Address in a Diameter Message," (Unpublished, filed Jan. 17, 2017).
"Digital cellular telecommunications system (Phase 2+) (GSM); Universal Mobile Telecommunications System (UMTS); LTE; Cx and Dx interfaces based on the Diameter protocol; Protocol details (3GPP TS 29.229 V 13.1.0 Release 13)," ETSI TS 129 229 V13.1.0, pp. 1-42 (Jan. 2017).
"Edge Router (DEA)," http://www.mavenir.com/our-products/mobile/edge-router-dea, pp. 1-7 (Copyright 2017).
Commonly-assigned, co-pending U.S. Appl. No. 15/376,631 for "Methods, Systems, and Computer Readable Media for Validating Subscriber Location Information," (Unpublished, filed Dec. 12, 2016).
Non-Final Office Action for U.S. Appl. No. 13/047,287 (dated Aug. 25, 2016).
"Digital cellular telecommunications system (Phase 2+); Universal Mobile Telecommunications System (UMTS); Numbering, addressing and identification (3GPP TS 23.003 V 12.9.0 Release 12)," ETSI TS 1 23 003 V12.9.0, pp. 1-93 (Mar. 2016).
"Syniverse Guide to LTE Roaming an Interoperability," https://www.syniverse.com/assets/files/custom_content/lte-roming-interoperability-guide.pdf, pp. 1-11 (Jan. 8, 2016).
"Digital cellular telecommunications system (Phase 2+) (GSM); Universal Mobile Telecommunications System (UMTS); LTE; Location Services (LCS); LCS Application Protocol (LCS-AP) between the Mobile Management Entity (MME) and Evolved Serving Mobile Location Centre (E-SMLC); SLs interface (3GPP TS 29.171 V 11.4.0 Release 11)," ETSI TS 129 171 V11.4.0, pp. 1-52 (Jan. 2016).
"Diameter Signaling Control (DSC)," https://www.extent.com/diameter-signaling-control-dsc/, pp. 1-3 (Copyright 2016).
Kotte, "Analysis and Experimental Verification of Diameter Attacks in Long Term Evolution Networks," http://www.diva-portal.org/smash/get/diva2:951619/FULLTEXT01.pdf, pp. 1-72 (2016).
Advisory Action Before the Filing of an Appeal Brief for U.S. Appl. No. 13/047,287 (dated Oct. 16, 2015).
"The Dialogic® Helix™ Signaling Controller," https://www.dialogic.com/-/media/products/docs/brochures/14090-helix-br.pdf, pp. 1-5 (Aug. 2015).
Final Office Action for U.S. Appl. No. 13/047,287 (dated Jun. 4, 2015).
DeKok, "The Network Access Identifier," Internet Engineering Task Force (IETF), RFC 7542, pp. 1-30 (May 2015).
"Digital cellular telecommunications system (Phase 2+); Universal Mobile Telecommunications System (UMTS); LTE; Location Services (LCS); Evolved Packet Core (EPC) LCS Protocol (ELP) between the Gateway Mobile Location Centre (GMLC) and the Mobile Management Entity (MME); SLg interface (3GPP TS 29.172 version 9.6.0 Release 9),"ETSI TS 129 172, V9.6.0, pp. 1-27 (Apr. 2015).
"Digital cellular telecommunications system (Phase 2+); Universal Mobile Telecommunications System (UMTS); LTE; Location Services (LCS); Diameter-based SLh interface for Control Plane LCS (3GPP TS 29.173 version 12.2.0 Release 12)," ETSI TS 129 173, V12.2.0, p. 1-20 (Oct. 2014).
Non-Final Office Action for U.S. Appl. No. 13/047,287 (dated Sep. 25, 2014).
Supplemental Notice of Allowance and Fee(s) Due for U.S. Appl. No. 12/823,559 (dated Aug. 23, 2013).
Notice of Alloance and Fee(s) Due for U.S. Appl. No. 12/823,559 (dated Aug. 1, 2013).
Email to U.S. Patent and Trademark Office dated Jun. 28, 2013.
Final Office Action for U.S. Appl. No. 12/823,559 (Apr. 11, 2013).
Final Office Action for U.S. Appl. No. 13/047,287 (dated Jan. 31, 2013).
Non-Final Office Action for U.S. Appl. No. 12/823,559 (dated Nov. 14, 2012).

"Digital cellular telecommunications system (Phase 2+); Universal Monile Telecommunications System (UMTS); LTE; Location Services (LCS); Service description; Stage1 (3GPP TS 22.071 V 11.0.0 Release 11)," ETSI TS 122 071 V11.0.0, pp. 1-50 (Oct. 2012).
Restriction and/or Election Requirement for U.S. Appl. No. 12/823,559 (Aug. 27, 2012).
Notice of Allowance and Fee(s) due for U.S. Appl. No. 12/581,739 (dated Aug. 8, 2012).
Non-Final Office Action for U.S. Appl. No. 13/047,287 (dated Jun. 6, 2012).
Notice of Allowance and Fee(s) Due and Examiner-Initiated Interview Summary for U.S. Appl. No. 12/581,739 (dated May 15, 2012).
Non-Final Office Action for U.S. Appl. No. 12/722,460 (dated Apr. 9, 2012).
"3rd Generation Partnership Project; Technical Specification Group Services and System Aspects; Telecommunication management; Charging management; Diameter charging applications (Release 11)," 3GPP TS 32.299, V11.3.0, pp. 1-150 (Mar. 2012).
Croft, N., "On Forensics: A Silent SMS Attack," Information and Computer Security Architectures (ICSA) Research Group, Department of Computer Science, pp. 1-4, University of Pretoria, South Africa (2012).
"Net-Net Diameter Director," http://www.oracle.com/us/industries/communications/net-net-diameter-director-ds-1985034.pdf, pp. 1-9 (Copyright 2012).
Final Office Action for U.S. Appl. No. 12/581,739 (dated Dec. 30, 2011).
"3rd Generation Partnership Project; Technical Specification Group Core Network and Terminals; Policy and Charging Control (PCC) over Gx/Sd reference point (Release 11)," 3GPP TS 29.212, V11.3.0, pp. 1-171 (Dec. 2011).
Non-Final Office Action for U.S. Appl. No. 12/581,739 (dated Aug. 26, 2011).
Press Release, "SmartSynch SmartMeters Communicate Using the Largest and Most Available Wireless Networks in the World," http://www.smartsynch.com/SmartSynch_gprs.htm, pp. 1-2 (Downloaded from the Internet on Jul. 5, 2011).
"Solution: Itron CENTRON GPRS," Data Sheet, http://www.smartsynch.com/SmartSynch_itron_centron.htm, pp. 1-3 (Downloaded from the Internet on Jul. 5, 2011).
Commonly-assigned, co-pending U.S. Appl. No. 13/047,287 (Unpubished, filed Mar. 14, 2011).
Myers, "SmartSynch Introduces Innovative 'DCX' Smart Grid Solution at DistribuTECH," SmartSynch News, http://www.appmesh.com/news/020309.htm, pp. 1-3 Feb. 3, 2009 (Downloaded from the Internet on Jul. 5, 2011).
"NES System Architecture," Data Sheet, Copyright 2009, pp. 1-2 (Downloaded from the Internet on Jul. 5, 2011).
"Wireless M-Bus and ZigBee®-enabled GSM/GPRS/ EDG Gateway for Smart Metering Introduced," Metering.com, http://www.metering.com/node/13550 Sep. 19, 2008, pp. 1-2 (Downloaded from the Internet on Jul. 5, 2011).
Constantin, L., "Remote SMS attack can force mobile phones to send premium-rate text messages: Applications installed by operators on SIM cards can be exploited remotely for SMS fraud and DoS purposes,"IDG News Service, Dec. 19, 2011, pp. 1-5, IDG Communications, Inc., United States.
Notification of Transmittal of the International Search Report and the Written Opinion of the International Searching Authority, or the Declaration for International Application No. PCT/US2010/027043 (dated Oct. 19, 2010).
"Draft LS on network verification of UE provided location," 3GPP TSG SA WG2 Meeting #81, pp. 1 (Oct. 11-15, 2010).
Notification of Transmittal of the International Search Report and the Written Opinion of the International Searching Authority, or the Declaration for International Application No. PCT/US2009/061187 (dated May 17, 2010).
Press Release, "Echelon and T-Mobile Announce Alliance to Reduce the Cost of a Secure Smart Grid Network for Utilities," Echelon Corp., http://www.3gamericas.org/index.cfm?fuseaction=pressreleasedisplay&pressreleaseid=2201, pp. 1-3 (Apr. 23, 2009).

(56) References Cited

OTHER PUBLICATIONS

"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272, V8.1.1, pp. 1-57 (Jan. 2009).

"3rd Generation Partnership Project; Technical Specification Group Core Network; Unstructured Supplementary Service Data (USSD); Stage 2 (Release 8)," 3GPP TS 23.090, V8.0.0, pp. 1-32 (Dec. 2008).

"3rd Generatio Partnership Project; Technical Specification Group Services and System Aspects; Unstructured Supplementary Service Data (USSD)—Stage 1 (Release 8)," 3GPP TS 22.090, V8.0.0, pp. 1-10 (Dec. 2008).

"Digital cellular telecommunications system (Phase 2+); Universal Mobile Telecommunications System (UMTS); Circuit Switched (CS) fallback in Evolved Packet System (EPS); Stage 2 (3GPP TS 23.272 V 8.0.0 Release 8)," ETSI TS 123 272 V8.0.0, pp. 1-42 (Nov. 2008).

Dierks et al., "The Transport Layer Security (TLS) Protocol Version 1.2," RFC 5246, pp. 1-208 (Aug. 2008).

3rd Generation Partnership Project "Technical Specification Group Core Network and Terminals; Study into routeing of MT-SMs via the HPLMN (Release 7)," 3GPP TR 23.840 V7.1.0 (Mar. 2007).

Hakala et al., "Diameter Credit-Control Application," RFC 4006, pp. 1-115 (Aug. 2005).

Housley et al., "Internet X.509 Public Key Infrastructure Certificate and Certificate Revocation List (CRL) Profile," RFC 3280, pp. 1-258 (Apr. 2002).

Office Communication for U.S. Appl. No. 17/125,943 (dated Mar. 1, 2023).

Notice of Allowance and Fee(s) Due for U.S. Appl. No. 17/175,260 (dated Feb. 27, 2023).

Applicant Initiated Interview Summary for U.S. Appl. No. 17/008,528 (dated Feb. 21, 2023).

Intent to Grant for Japanese Patent Application No. 2020-572898 (dated Feb. 14, 2023).

Intent to Grant for Japanese Patent Application No. 2021-506739 (dated Jan. 24, 2023).

Notice of Allowance and Fee(s) Due for U.S. Appl. No. 17/319,023 (dated Feb. 10, 2023).

Non-Final Office Action for U.S. Appl. No. 17/125,943 (dated Feb. 9, 2023).

Supplemental Notice of Allowability for U.S. Appl. No. 17/076,482 (dated Jan. 19, 2023).

Non-Final Office Action for U.S. Appl. No. 17/129,441 (dated Jan. 19, 2023).

Intent to Grant for European Patent Application No. 18705270.9 (dated Dec. 8, 2022).

Applicant Initiated Interview Summary for U.S. Appl. No. 17/319,023 (dated Jan. 10, 2023).

Non-Final Office Action for U.S. Appl. No. 17/099,683 (dated Jan. 4, 2023).

Telekom, "N32 Message Anti-Spoofing within the SEPP," 3GPP TSG SA WG3 (Security) Meeting #91, S3-181480, pp. 1-2 (Apr. 2018).

Huawei, "New Annex for the SEPP in TR 33.926", 3GPP TSG-SA WG3 Meeting #95-BIS, S3-192180, pp. 1-5 (Jun. 2019).

"5G; 5G System; Public Land Mobile Network (PLMN) Interconnection; Stage 3 (3GPP TS 29.573 Version 16.3.0 Release 16)," ETSI TS 129 573, V16.3.0, pp. 1-93 (Jul. 2020).

Communication under Rule 71(3) EPC Intention to Grant for European Patent Application Serial No. 20 720 580.8 (dated Dec. 23, 2022).

Non-Final Office Action for U.S. Appl. No. 17/095,420 (dated Jan. 3, 2023).

Applicant-Initiated Interview Summary for U.S. Appl. No. 17/099,683 (dated Dec. 12, 2022).

Notice of Allowance and Fee(s) Due for U.S. Appl. No. 17/076,482 (dated Dec. 1, 2022).

Notice to Grant for Japanese Patent Application Serial No. 2021-500828 (dated Nov. 25, 2022).

Examination Report for Indian Application Serial No. 202247032585 (dated Nov. 15, 2022).

Non-Final Office Action for Chinese Patent Application Serial No. 202080091056.6 (dated Oct. 27, 2022).

Non-Final Office Action for U.S. Appl. No. 17/008,528 (dated Nov. 10, 2022).

"5G; Architecture enhancements for 5G System (5GS) to support network data analytics services (3GPP TS 23.288 version 16.4.0 Release 16)," ETSI TS 123 288, V16.4.0, pp. 1-68 (Jul. 2020).

Applicant-Initiated Interview Summary for U.S. Appl. No. 17/095,420 (dated May 12, 2023).

Applicant-Initiated Interview Summary for U.S. Appl. No. 17/095,420 (dated May 17, 2023).

Decision to Grant for European Patent Application 20720580.8 (dated May 11, 2023).

Notice of Allowance and Fee(s) Due for U.S. Appl. No. 17/099,683 (dated May 8, 2023).

Office Action for Chinese Patent Application Serial No. 202080091056.6 (dated Mar. 25, 2023).

Applicant-Initiated Interview Summary for U.S. Appl. No. 17/099,683 (dated Apr. 17, 2023).

Final Office Action for U.S. Appl. No. 17/099,683 (dated Apr. 6, 2023).

Applicant-Initiated Interview Summary for U.S. Appl. No. 17/099,683 (dated Apr. 5, 2023).

Notice of Allowance and Fee(s) Due for U.S. Appl. No. 17/008,528 (dated Mar. 30, 2023).

Supplemental Notice of Allowability for U.S. Appl. No. 17/175,260 (dated Mar. 8, 2023).

Notice of Publication for European Patent Application No. 21720355.3 (dated Jun. 7, 2023).

Notice of Publication for European Patent Application Serial No. 21755248.8 (Aug. 23, 2023).

Notice of Publication for European Patent Application No. 21732663.6 (Aug. 2, 2023).

\* cited by examiner

| SERVICE NAME | V-PLMN CONSUMER NF | MESSAGE INPUTS |
| --- | --- | --- |
| NPCF-UEPOLICYCONTROL | PCF | SUPI |
| NUDM-SDM | AMF | SUPI |
| NUDM-UECM | AMF | SUPI |
| NAUSF-UEAUTHENTICATION | AMF | SUCI |
| NSMF-PDUSESSION | SMF | SUPI |
| NSSF-NSSELECTION | NSSF | PLMN ID OF A SUPI |
| NNRF-DISC | NRF | OPTIONAL SUPI |
| NNRF-NFM | NRF | OPTIONAL SUPI |

METHODS, SYSTEMS, AND COMPUTER READABLE MEDIA FOR MESSAGE VALIDATION IN FIFTH GENERATION (5G) COMMUNICATIONS NETWORKS

TECHNICAL FIELD

The subject matter described herein relates to enhancing security in fifth generation (5G) communications networks. More particularly, the subject matter described herein relates to methods, systems, and computer readable media for message validation in 5G communications networks.

BACKGROUND

In fifth generation (5G) communications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. Consumer NFs can subscribe to receive information about producer NF instances that have registered with the NRF. In addition to consumer NFs, another type of network node that can subscribe to receive information about NF service instances is a service communications proxy (SCP). The SCP subscribes with the NRF and obtains reachability and service profile information regarding producer NF service instances. Consumer NFs connect to the service communications proxy, and the service communications proxy load balances traffic among producer NF service instances that provide the required service or directly routes the traffic to the destination producer NF instance.

In addition to the SCP, other examples of intermediate proxy nodes or groups of network nodes that route traffic between producer and consumer NFs include the security edge protection proxy (SEPP), the service gateway, and nodes in the 5G service mesh. The SEPP is the network node used to protect control plane traffic that is exchanged between different 5G public land mobile networks (PLMNs). As such, the SEPP performs message filtering, policing, and topology hiding for all application programming interface (API) messages.

However, there exists a need for improved security measures at one or more NFs.

SUMMARY

Methods, systems, and computer readable media for message validation in fifth generation (5G) communications networks are disclosed. One example method for message validation in 5G communications networks comprises: at a first network node of a first network: obtaining, from at least one authentication and key agreement (AKA) procedure related message associated with a user device communicating via a second network, authentication information identifying the user device; storing the authentication information in a data store for validating subsequent messages; receiving a request message associated with the user device; determining, using the authentication information, that the request message is invalid; and in response to determining that the request message is invalid, performing an invalid message action.

One example system for message validation in 5G communications networks includes a first network node of a first network comprising at least one processor and a memory. The first node is configured for: obtaining, from at least one AKA procedure related message associated with a user device communicating via a second network, authentication information identifying the user device; storing the authentication information in a data store for validating subsequent messages; receiving a request message associated with the user device; determining, using the authentication information, that the request message is invalid; and in response to determining that the request message is invalid, performing an invalid message action.

One example non-transitory computer readable medium comprising computer executable instructions embodied in the non-transitory computer readable medium that when executed by at least one processor of at least one computer cause the at least one computer to perform steps comprising: at a first network node of a first network: obtaining, from at least one AKA procedure related message associated with a user device communicating via a second network, authentication information identifying the user device; storing the authentication information in a data store for validating subsequent messages; receiving a request message associated with the user device; determining, using the authentication information, that the request message is invalid; and in response to determining that the request message is invalid, performing an invalid message action.

According to an aspect of the subject matter described herein, determining, using authentication information, that a request message is invalid may comprise retrieving, using an user device identifier in the request message, the authentication information from a data store and determining that the authentication information fails to confirm that the user device is roaming in the network from which the request message originates.

According to an aspect of the subject matter described herein, a request message for message validation may include a nudm-sdm service message, a nudm-uecm service message, a npcf-uepolicy service message, a nsmf-pdusession service message, a nnrf-disc service message, or a nnrf-nfm service message.

According to an aspect of the subject matter described herein, an AKA procedure related message may include a message containing an AuthenticationInfo data type, an UEAuthenticationCtx data type, a ConfirmationData data type, or a ConfirmationDataResponse data type.

According to an aspect of the subject matter described herein, authentication information usable for identifying a user device or a network may include a network identifier, a user equipment identifier, a network node identifier, a subscription permanent identifier (SUPI), a subscription concealed identifier (SUCI), or a public land mobile network (PLMN) identifier.

According to an aspect of the subject matter described herein, a first network node includes a security edge protection proxy (SEPP), a 5G core network function, a network proxy, or a network gateway.

According to an aspect of the subject matter described herein, at least one AKA procedure related message is sent via a second network node of a second network, wherein the second network node includes a consumer network function (NF), a policy control function (PCF), an access and mobility management Function (AMF), a session management function (SMF), a network repository function (NRF), a network slice selection function (NSSF), or a 5G core network function.

According to an aspect of the subject matter described herein, an invalid message action may include discarding a request message or notifying a network operator or a management system.

According to an aspect of the subject matter described herein, a first network may be a home PLMN and a second network may be a visited PLMN.

The subject matter described herein may be implemented in hardware, software, firmware, or any combination thereof. As such, the terms "function" "node" or "module" as used herein refer to hardware, which may also include software and/or firmware components, for implementing the feature being described. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 4 is a diagram illustrating example identification data associated with various 5G service messages;

DETAILED DESCRIPTION

The subject matter described herein relates to methods, systems, and computer readable media for message validation in fifth generation (5G) communications networks. In accordance with some aspects of the subject matter described herein, methods, systems, mechanisms, and/or techniques for performing message validation using stored authentication information obtained or derived from an user equipment (UE) authentication procedure (e.g., a 5G authentication and key agreement (AKA) procedure) are provided. For example, a security edge protection proxy (SEPP) in accordance with various aspects described herein can obtain or derive UE related authentication information (e.g., a UE identifier, a serving PLMN identifier, and UE authentication status) obtained by monitoring messages related to a 5G AKA procedure for authenticating a UE. In this example, the SEPP can avoid or mitigate security attacks and other issues by using the same authentication information for validating subsequent inter PLMN messages associated with the UE. Advantageously, by utilizing one or more techniques and/or methods described herein, a SEPP or another network node can prevent DOS attacks that use inter-PLMN traffic, prevent theft of subscriber data from a home network, and/or implement subscriber level authorization.

Reference will now be made in detail to various embodiments of the subject matter described herein, examples of which are illustrated in the accompanying drawings. Wherever possible, the same reference numbers will be used throughout the drawings to refer to the same or like parts.

Figure 1:
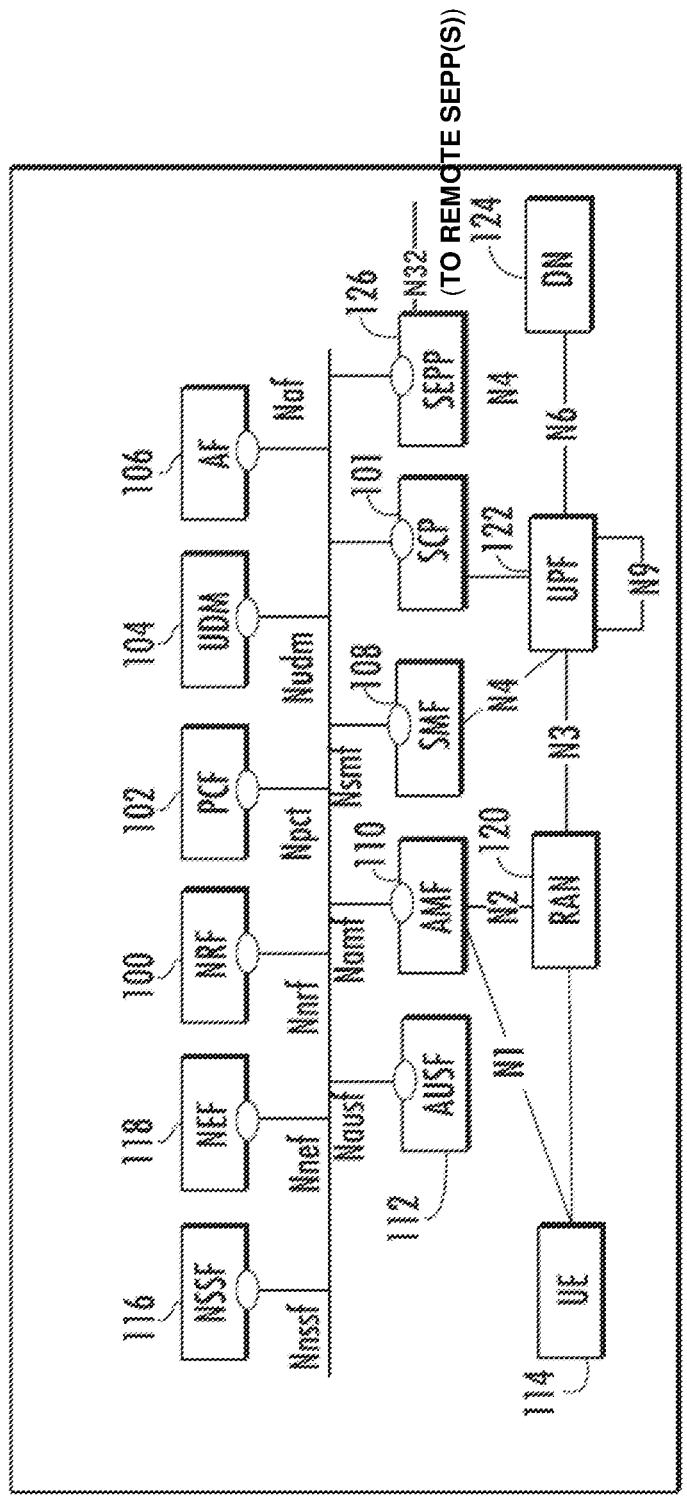
FIG. 1 is a network diagram illustrating an example fifth generation (5G) network architecture.

FIG. 1 is a block diagram illustrating an example 5G system network architecture, e.g., a home 5G core (5GC) network. The architecture in FIG. 1 includes NRF 100 and SCP 101, which may be located in the same home public land mobile network (PLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs. In addition, using the methodologies described herein, SCP 101 may perform preferred NF location based selection and routing.

NRF 100 is a repository for NF or service profiles of producer NF instances. In order to communicate with a producer NF instance, a consumer NF or an SCP must obtain the NF or service profile or the producer NF instance from NRF 100. The NF or service profile is a JavaScript object notation (JSON) data structure defined in Third Generation Partnership Project (3GPP) Technical Specification (TS) 29.510. The NF or service profile definition includes at least one of a fully qualified domain name (FQDN), an Internet protocol (IP) version 4 (IPv4) address or an IP version 6 (IPv6) address. In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user devices, such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

Security edge protection proxy (SEPP) 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN.

SEPP 126 may utilize an N32-c interface and an N32-f interface. An N32-c interface is a control plane interface between two SEPPs usable for performing an initial handshake (e.g., a TLS handshake) and negotiating various parameters for an N32-f interface connection and related message forwarding. An N32-f interface is a forwarding interface between two SEPPs usable for forwarding various communications (e.g., 5GC requests) between a consumer NF and a producer NF after applying application level security protection.

One issue with the existing 5G architecture is that the existing 5G architecture does not utilize resource or object level authorization. Instead, the existing 5G architecture utilizes an authorization model based on API access. For example, if a compromised AMF in a trusted (but compromised or hacked) visitor PLMN (V-PLMN) has access to an nudm-sdm service, the AMF may request and receive UE subscription data from a UDM of a home network without the home network or a network node therein confirming that the related UE is actually roaming. In another example, a compromised SEPP in a trusted V-PLMN can trigger a signaling storm or initiate a denial of service (DOS) attack by sending a significant number of inter-PLMN messages to a SEPP in a home PLMN. Hence, a SEPP in a home PLMN provides little protection against a trusted but compromised V-PLMN.

Figure 2:
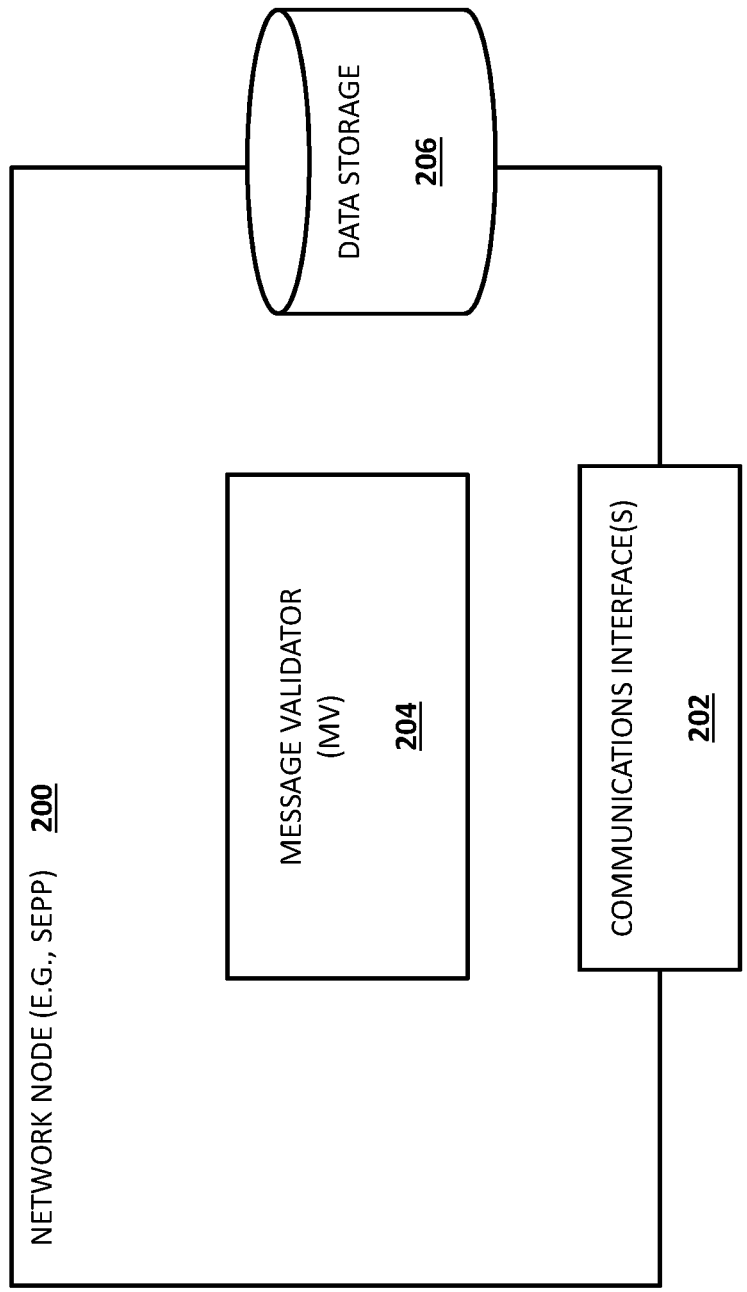
FIG. 2 is a diagram illustrating an example node for message validation in 5G communications networks.

FIG. 2 is a diagram illustrating an example node 200 for message validation in 5G communications networks. Node 200 may represent any suitable entity or entities for performing aspects of message validation. In some embodiments, node 200 may represent or include one or more 5GC NFs, e.g., a SEPP, an NRF, a PCF, an NSSF, an NEF, a UDM, an AUSF, a UDR, a binding support function (BSF), or an unstructured data storage function (UDSF). In some embodiments, node 200 may represent or include a network gateway, a network proxy, an edge security device, or related functionality.

In some embodiments, node 200 or a related module may be configured (e.g., via programming logic) to perform message validation on inter-PLMN messages using UE related authentication information obtained during an AKA procedure, thereby reducing or mitigating the impact of unauthorized and/or malicious entities interacting with network nodes in a 5G home network. For example, node 200 or a related module may be configured to identify and store authentication information (e.g., one or more UE identifiers and a serving network name associated with UE 114) when UE 114 is authenticated by a home network and may then determine whether inter-PLMN messages (e.g., UDM information requests) appearing to be related to UE 114 are valid, e.g., by using the stored authentication information to confirm that UE 114 is roaming in the network from which the inter-PLMN messages originate.

Referring to FIG. 2, node 200 may include one or more communications interface(s) 202 for communicating messages via a communications environment, e.g., a home 5GC network. In some embodiments, communications interface(s) 202 may include a first communication interface for communicating with one or more SEPPs 126 in a first network, a second communications interface for communicating with one or more SEPPs 126 in a second network, and a third communications interface for communicating with one or more SEPPs 126 in a home network, e.g., a home 5GC network.

Node 200 may include a message validator (MV) 204. MV 204 may be any suitable entity (e.g., software executing on at least one processor) for performing one or more aspects message validation. In some embodiments, MV 204 may include functionality for obtaining, from at least one AKA procedure related message associated with a user device communicating via a second network, authentication information identifying the user device and for using the authentication information for validating subsequent messages that are (or appear to be) associated with the user device. In some embodiments, obtaining authentication information from at least one AKA procedure related message may include monitoring or inspecting AKA procedure related messages that traverse node 200. In another example, obtaining authentication information from at least one AKA procedure related message may include inspecting copies of AKA procedure related messages sent to MV 204. In some embodiments, MV 204 may obtain one or more identifiers (e.g., a SUPI or SUCI and a serving network name) from a first AKA procedure related message (e.g., a nausf-ueauthentication request) and obtain additional information (e.g., an authentication context identifier) from a second AKA procedure related message (e.g., a nausf-ueauthentication response).

In some embodiments, MV 204 may be configured for monitoring an N32-f interface connection for inter-PLMN messages (e.g., HTTP/2 messages). For example, for a received inter-PLMN message, MV 204 may determine, using relevant stored authentication information, whether the inter-PLMN message is valid. In this example, MV 204 may identify UE identifying information in the inter-PLMN message and may use that information to query data storage 206 and obtain relevant authentication information. Continuing with this example, MV 204 may analyze the stored authentication information to determine whether the authentication information confirms or supports that UE 114 is roaming in the network from which the inter-PLMN message originates. If the authentication information confirms or supports that UE 114 is roaming in the network from which the inter-PLMN message originates, then the inter-PLMN message may be deemed valid. If the authentication information does not confirm or support that UE 114 is roaming in the network from which the inter-PLMN message originates, the inter-PLMN message may be deemed invalid.

In some embodiments, MV 204 may be configured for determining that an ingress inter-PLMN message associated with UE 114 is invalid when there is no relevant stored authentication information available to use. For example, if UE 114 has not been authenticated by H-PLMN 490 and/or stored authentication information is unavailable, then MV 204 may deem any inter-PLMN message associated with UE 114 invalid.

Node 200 may access (e.g., read from and/or write information to) data storage 206. Data storage 206 may be any suitable entity (e.g., a computer readable medium or memory) for storing various data. In some embodiments, data storage 206 may include authentication information for user devices and/or related information used in performing message validation. For example, data store 206 may include data records or entries containing various types of authentication information (e.g., information usable for identifying and/or authenticating UEs) and that are indexed using one or more keys, e.g., unique UE identifiers, a unique authentication context identifier, or a unique combination of identifiers. In this example, each data record or entry may relate to a roaming subscriber or related UE and may include one or more UE identifier identifiers and other authentication information (e.g., a serving network name or identifier, an authentication context identifier, an authentication result indicating that the authentication was successful). Example authentication information may include an authentication status, a network identifier, a user equipment identifier, a network node identifier, a subscription permanent identifier (SUPI), a subscription concealed identifier (SUCI), or a PLMN identifier.

In some embodiments, data storage 206 may include logic for obtaining authentication information from various AKA procedure related messages, logic for obtaining UE identifying information from various inter-PLMN messages, logic for performing message validation using stored authentication information, logic for implementing or triggering an invalid message action or valid message action.

It will be appreciated that FIG. 2 and its related description are for illustrative purposes and that node 200 may include additional and/or different modules, components, or functionality.

Figure 3:
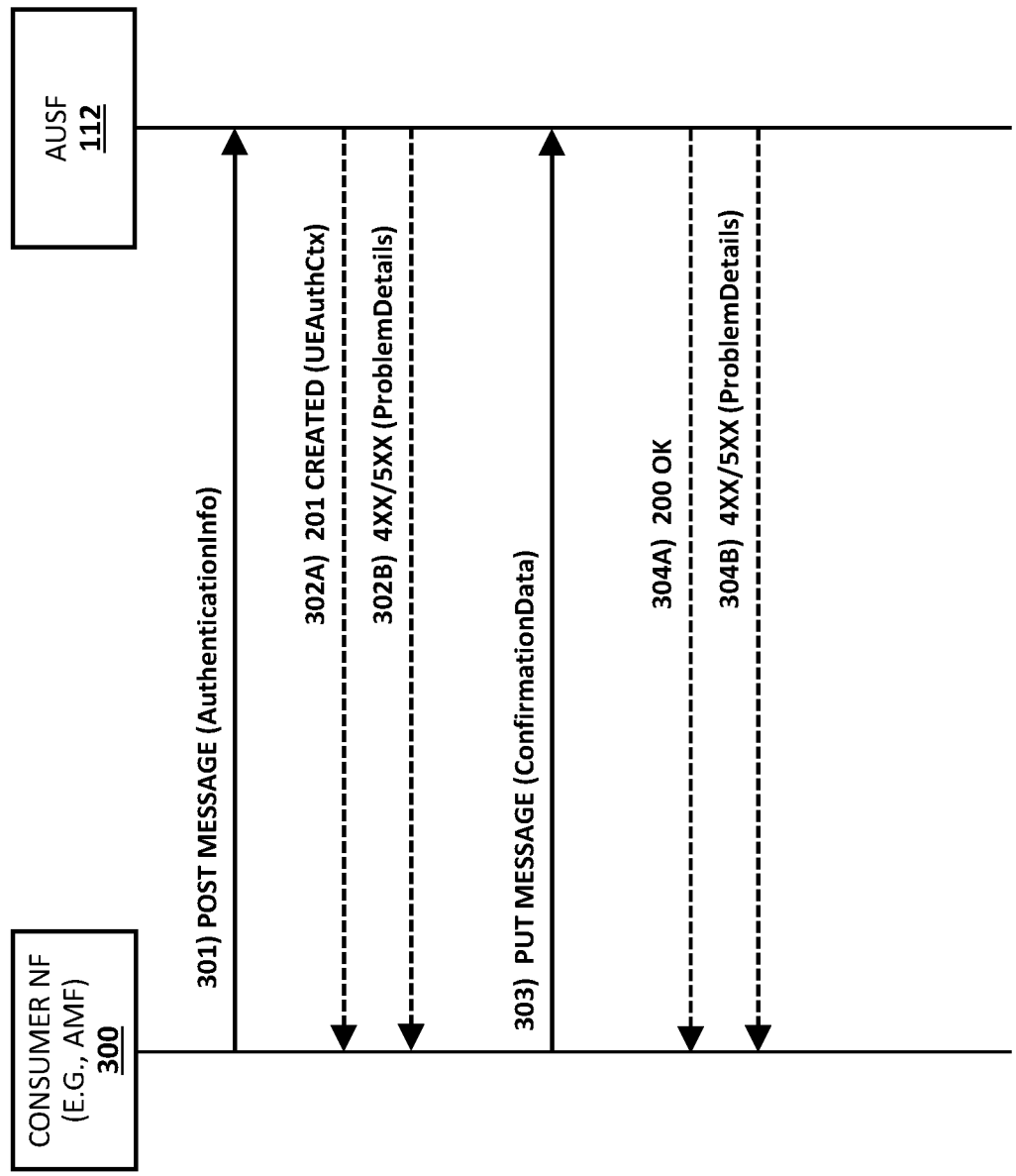
FIG. 3 is a message flow diagram illustrating an example authentication and key agreement (AKA) procedure involving a consumer network function (NF) and an authentication server function (AUSF)

FIG. 3 is a message flow diagram illustrating an example AKA procedure involving a consumer NF 300 and AUSF 112. In some embodiments, consumer NF 300 may represent a network node in a V-PLMN that interacts with AUSF 112. For example, consumer NF 300 (e.g., an AMF in a V-PLMN (V-AMF)) may request authentication of UE 114 by providing UE related information and a serving network name to AUSF 112, which may then retrieve UE related information and an authentication method from UDM 104. In this example, an intermediate node (e.g., H-SEPP 126 between consumer NF 300 and AUSF 112) that receives and forwards various messages involved in the 5G AKA procedure may be configured for obtaining and storing authentication information associated with UE 114 for message validation of subsequent inter-PLMN messages associated with UE 114.

The 5G AKA procedure and other security procedures are defined in Third Generation Partnership Project (3GPP) Technical Specification (TS) 33.501. The 5G AKA procedure associated with the Nausf_UEAuthentication service is further defined in TS 29.509. As defined in TS 29.509, various messages are used in the 5G AKA procedure and may include various structured data types comprising authentication information usable for performing message validation as described herein. For example, some structured data types may include a UE identifier (e.g., a SUPI, a SUCI, etc.), a serving network identifier (e.g., a servingNetworkName), an authentication type (e.g., an authType), an authentication result (e.g., an authResult), and/or other information.

Some example structured data types defined in TS 29.509 that can comprise authentication information are depicted below, including an AuthenticationInfo data type, an UEAuthenticationCtx data type, a ConfirmationData data type, and a ConfirmationDataResponse data type.

```
AuthenticationInfo {
    supiOrSuci*,
    servingNetworkName*,
    resynchronizationInfo,
    pei,
    traceData,
    udmGroupId,
    routingIndicator,
    cagId,
    n5gcInd
}
UEAuthenticationCtx {
    authType*,
    5gAuthData*,
    _links*,
    servingNetworkName
}
ConfirmationData {
    resStar*
}
ConfirmationDataResponse {
    authResult*,
    supi,
    kseaf
}
```

Referring to FIG. 3, in step 301, consumer NF 300 may send a POST request to AUSF 112. The payload of the POST request may include an AuthenticationInfo data type comprising a UE identifier (e.g., a SUPI or SUCI) and a serving network identifier (e.g., a servingnetworkname) associated with UE 114.

In step 302A, if successful, a "201 Created" message may be return. The message may include an UEAuthenticationCtx data type comprising various authentication related information.

In step 302B, if unsuccessful, a "4XX or 5XX" message may be returned indicating an HTTP status code and containing a ProblemDetails structure with the "cause" attribute set.

In step 303, consumer NF 300 may send a PUT request to AUSF 112. The put request may include an ConfirmationData data type comprising "RES*" information provided by UE 114 or comprising a null value if the "RES*" information is not provided.

In step 304A, if successful, a "200 OK" message may be return. The message may indicate whether UE 114 is authenticated. If UE 114 is not authenticated, e.g. because the verification of the "RES*" information was not successful by AUSF 112, the AuthResult value in the message may be set to "AUTHENTICATION_FAILURE".

In step 304B, if unsuccessful, a "4XX or 5XX" message may be returned indicating an HTTP status code and containing a ProblemDetails structure with the "cause" attribute set.

It will be appreciated that FIG. 3 is for illustrative purposes and that different and/or additional messages and/or actions may be used. It will also be appreciated that various messages and/or actions described herein may occur in a different order or sequence.

FIG. 4 is a diagram illustrating example identification data 400 associated with various 5G service messages. In some embodiments, data 400 may indicate inter-PLMN messages associated with 5G services, consumer NFs that use the 5G services, and message inputs found in the inter-PLMN messages for identifying a UE or a related serving network (e.g., the network that UE is roaming in). For example, when UE 114 is roaming in a visitor PLMN (V-PLMN), various communications between the home PLMN (H-PLMN) of UE 114 and the V-PLMN may be needed to obtain or provide information associated with UE 114. As disclosed above, inter-PLMN messages may be sent between the H-PLMN and the V-PLMN via SEPPs 126 in the respective networks. However, inter-PLMN messages represent various types of messages associated with different 5G interfaces or services and that originate from different network nodes (see Table 1 below). As such, different inter-PLMN messages may include different types of UE identifying information or network identifying information.

Table 1 depicts various inter-PLMN messages that can traverse H-SEPP 126. As indicated in Table 1, different 5G services or related interfaces may utilize messages that comprise different message inputs and/or message formats.

TABLE 1

EXAMPLE INTER-PLMN MESSAGES nausf-auth/v1/ue-authentications
/nausf-auth/v1/ue-authentications/{authCtxId}/5g-aka-confirmation
/nnssf-nsselection/v1/network-slice-information
/npcf-ue-policy-control/v1/policies
/npcf-ue-policy-control/v1/policies/{polAssoId}
/npcf-ue-policy-control/v1/policies/{polAssoId}/update
/nsmf-pdusession/v1/pdu-sessions
/nsmf-pdusession/v1/pdu-sessions/{pduSessionRef}/modify
/nsmf-pdusession/v1/pdu-sessions/{pduSessionRef}/release
/nnrf-disc/v1/nf-instances
    /nnrf-nfm/v1/subscriptions
/nnrf-nfm/v1/subscriptions/{subscriptionID}
/oauth2/token
/nudm-uecm/v1/{ueId}/registrations/amf-3gpp-access
/nudm-uecm/v1/{ueId}/registrations/amf-non-3gpp-access
/nudm-uecm/v1/{ueId}/registrations/smf-registrations/{pduSessionId}
/nudm-uecm/v1/{ueId}/registrations/smsf-3gpp-access
/nudm-uecm/v1/{ueId}/registrations/smsf-non-3gpp-access
/nudm-sdm/v1/{supi}
/nudm-sdm/v1/{supi}/am-data
/nudm-sdm/v1/{supi}/am-data/sor-ack
/nudm-sdm/v1/{supi}/nssai
/nudm-sdm/v1/{supi}/sdm-subscriptions
/nudm-sdm/v1/{supi}/sdm-subscriptions/{subscriptionId}
/nudm-sdm/v1/{supi}/sm-data
/nudm-sdm/v1/{supi}/ue-context-in-smf-data
/nudm-sdm/v1/shared-data
/nudm-sdm/v2/{supi}/am-data/upu-ack
(# v2 version APIs corresponding to v1 APIs are skipped for brevity)

In some embodiments, node 200, H-SEPP 126, or MV 204 may be configured to identify relevant message inputs or values of various inter-PLMN messages (like those in Table 1) when performing message validation. For example, node 200 or MV 204 may analyze different types of UE identifying information (e.g., a SUPI or SUCI) depending on which type of inter-PLMN message is received and what type of UE identifying information is available in the received inter-PLMN message.

Referring to FIG. 4, a table representing data 400 comprises columns and/or fields for service name, V-PLMN consumer NF, and message input(s). A service name field may store information for representing a group of inter-PLMN messages associated with a particular service or related interface. For example, the first data row of the table of FIG. 4 indicates a service name field value 'npcf-uepolicycontrol'. In this example, the service name field value 'npcf-uepolicycontrol' may represent a group of messages associated with a UE policy control service. In another example, the second data row of the table of FIG. 4 indicates a service name field value 'nudm-sdm. In this example, the service name field value 'nudm-sdm' may represent a group of messages associated with a service for retrieve UE subscription data from a UDM. Example service names may include npcf-uepolicycontrol, nudm-sdm, nudm-uecm, nausf-ueauthentication, nsmf-pdusession, nssf-nsselection, nnrf-disc, or nnrf-nfm.

A V-PLMN consumer NF field may store information for representing a particular consumer NF that is sending or originating a particular type or group (e.g., service related) inter-PLMN message. For example, the first data row of the table of FIG. 4 indicates a V-PLMN consumer NF field value 'PCF'. In this example, the V-PLMN consumer NF field value 'PCF' may indicate that a PCF located in a V-PLMN can send npcf-uepolicycontrol service messages. In another example, the fifth data row of the table of FIG. 4 indicates a V-PLMN consumer NF field value 'SMF'. In this example, the V-PLMN consumer NF field value 'SMF' may indicate that an SMF located in a V-PLMN can send nsmf-pdusession service messages. Example V-PLMN consumer NFs may include an AMF (e.g., an AMF in a V-PLMN), an SMF (e.g., an SMF in a V-PLMN), an NSSF (e.g., an NSSF in a V-PLMN), or an NRF (e.g., an NRF in a V-PLMN).

A message input(s) field may store information in a particular type or group (e.g., service related) inter-PLMN message usable identifying a UE or a related serving network (e.g., the network that UE is roaming in). For example, the first data row of the table of FIG. 4 indicates a message input(s) field value 'SUPI'. In this example, the message input(s) field value 'SUPI' indicates that a npcf-uepolicycontrol service message may include a SUPI usable for identifying a roaming UE, e.g., UE 114. In another example, the fourth data row of the table of FIG. 4 indicates a message input(s) field value 'SUCI'. In this example, the message input(s) field value 'SUCI' indicates that a nausf-ueauthentication service message may include a SUCI usable for identifying a roaming UE, e.g., UE 114. Example message input(s) for various inter-PLMN messages may include a SUPI, a SUCI, a PLMN ID of a SUPI, or an optional SUPI.

It will also be appreciated that data 400 is for illustrative purposes and that different and/or additional data than the data depicted in FIG. 4 may be usable for indicating default values for particular data portions or other information. Further, data 400 may be stored (e.g., in data storage 206) and managed using various data structures and/or computer readable media.

Figure 5A:
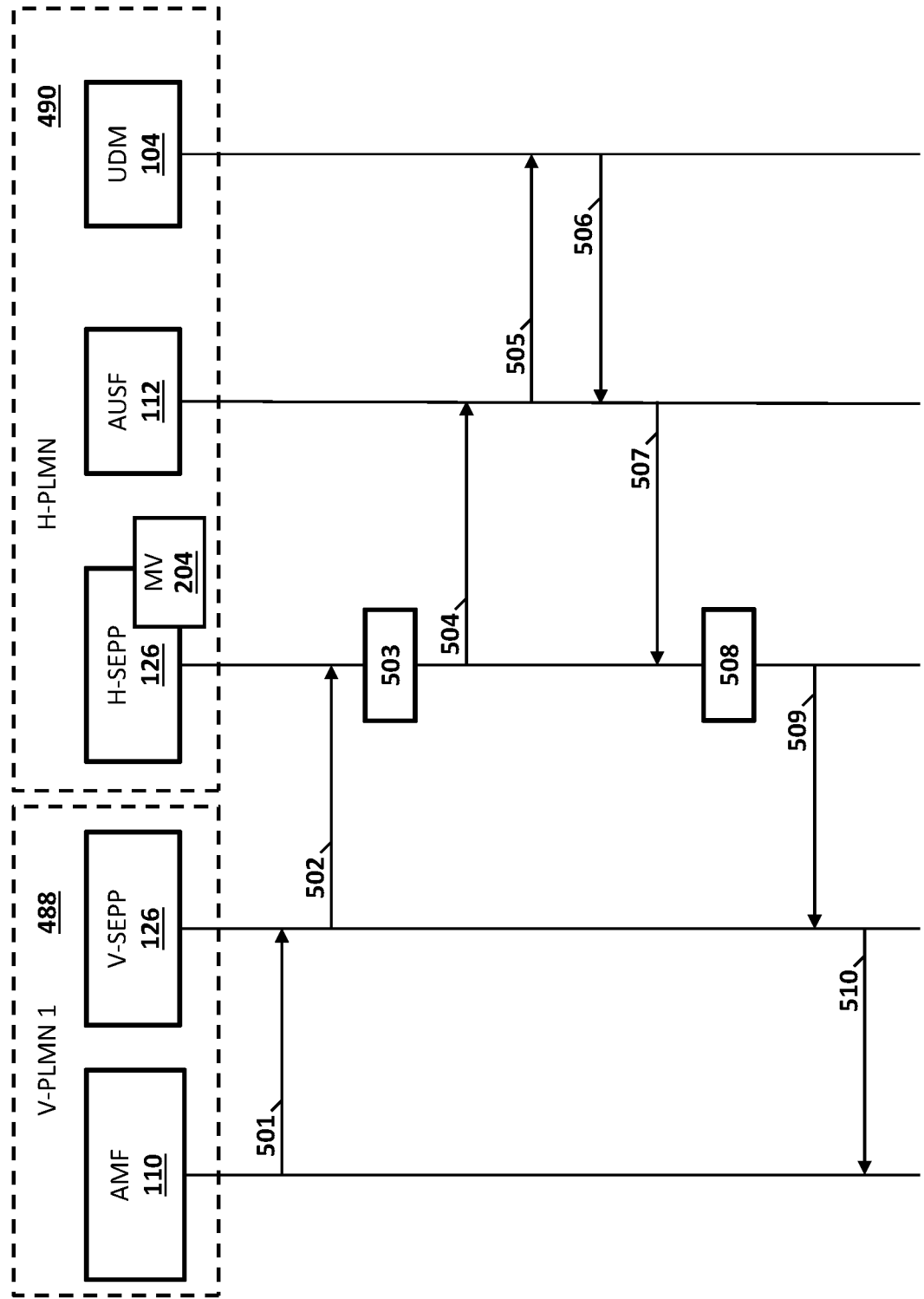
FIGS. 5A-5B depicts a message flow diagram illustrating obtaining user equipment (UE) identifiers from messages related to an authentication procedure.
Figure 5B:
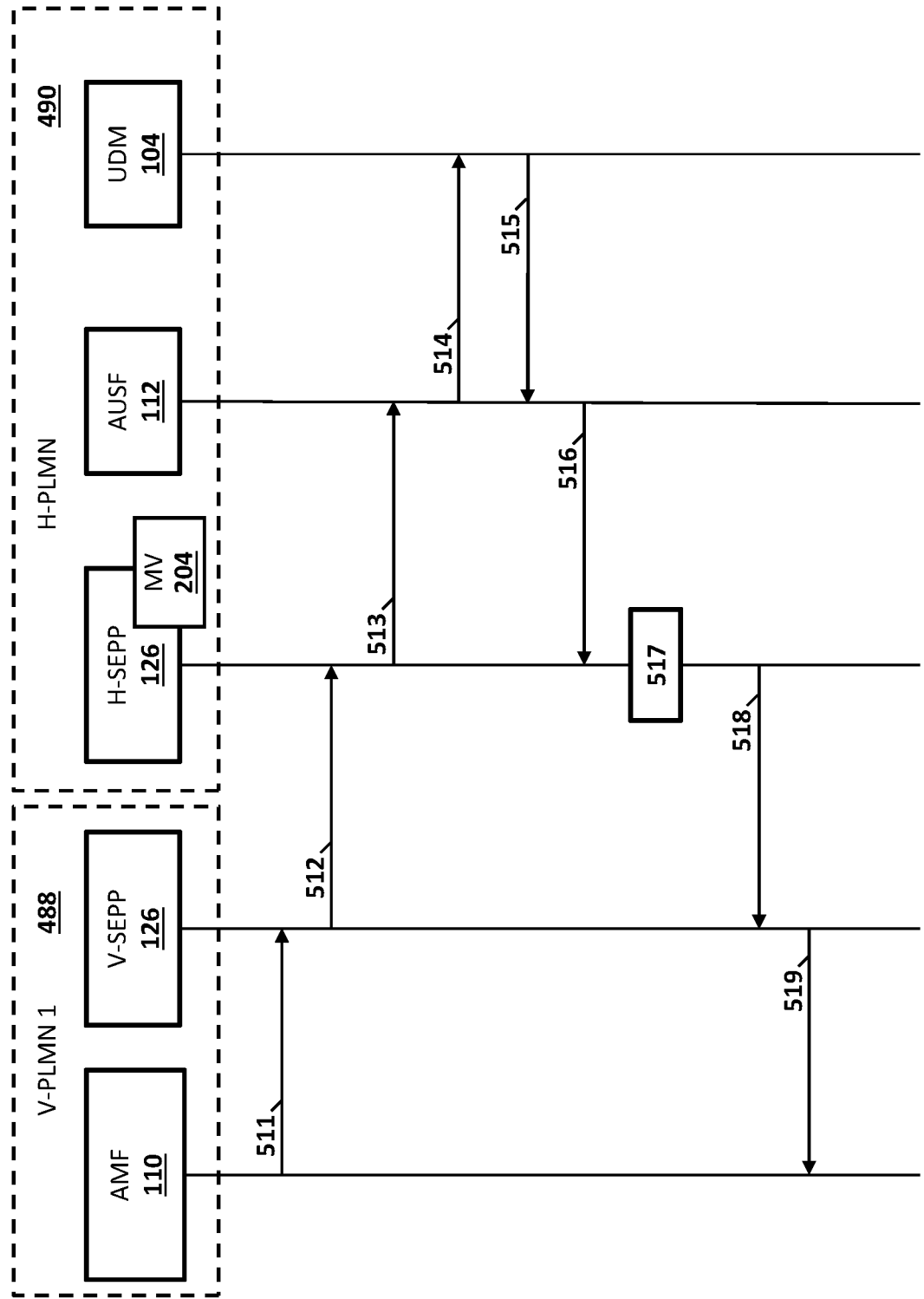

FIGS. 5A-5B depicts a message flow diagram illustrating obtaining authentication information from messages related to an authentication procedure. Referring to FIG. 5A-5B, UE 114 may trigger an AKA procedure that involves an AMF 110 in V-PLMN 1 488 communicating with AUSF 112 in H-PLMN 490. As depicted in FIGS. 5A-5B, various AKA related messages may traverse V-SEPP 126 and H-SEPP 126 during the AKA procedure.

In some embodiments, H-SEPP 126 or node 200 (e.g., a network node involved in an AKA procedure) may include MV 204 or similar functionality for observing AKA procedure related messages and for obtaining and storing authentication information (e.g., UE identifiers and a serving network name) from those messages. For example, H-SEPP 126 or MV 204 therein may obtain and store authentication information (e.g., a SUPI or SUCI and a serving network name) from a nausf-ueauthentication request. In this example, H-SEPP 126 or MV 204 therein may also obtain authentication session identification information (e.g., an authentication context identifier) from an nausf-ueauthentication response and may associate this session identification information and the previously stored authentication information. Continuing with this example, H-SEPP 126 or MV 204 therein may also obtain additional authentication related information (e.g., an optional SUPI and an authentication result) from another nausf-ueauthentication response.

Referring to FIG. 5A, in step 501, AMF 110 may send, toward AUSF 112 via V-SEPP 126, an authentication request message (e.g., an nausf-ueauthentication message) indicating a SUPI or a SUCI and serving network name information for authenticating UE 114.

In step 502, V-SEPP 126 may receive the authentication request message and may send the authentication request message or a version thereof to H-SEPP 126 via an N-32 interface.

In step 503, H-SEPP 126 and/or MV 204 may receive the authentication request message and may store identification information therein (e.g., a SUPI or a SUCI and serving network name information) associated with UE 114.

In step 504, H-SEPP 126 may send the authentication request message or a version thereof to AUSF 112 in H-PLMN 490.

In step 505, after receiving the authentication request message, AUSF 112 may send obtained identification information (e.g., in an nudm-ueauthentication request message) to UDM 104 in H-PLMN 490.

In step 506, UDM 104 may receive the identification information and respond by sending authentication response information including a 5G home environment (HE) authentication vector (AV) and, optionally, a SUPI (e.g., in an nudm-ueauthentication response message) to AUSF 112.

In step 507, AUSF 112 may receive the authentication response information and may send an authentication response message (e.g., an nausf-ueauthentication response message) containing authentication related information (e.g., a 5G HE AV and an authentication context identifier) toward AMF 110 via H-SEPP 126.

In step 508, H-SEPP 126 and/or MV 204 may receive the authentication response message and may obtain authentication related information therein (e.g., an authentication context identifier) and may store and associate this authentication related information with the stored identification information associated with UE 114.

In step 509, H-SEPP 126 may send the authentication response message or a version thereof to V-SEPP 126 via an N-32 interface.

In step 510, V-SEPP 126 may receive the authentication response message and may send the authentication response message or a version thereof to AMF 110.

Referring to FIG. 5B, in step 511, AMF 110 may send, toward AUSF 112, an authentication confirmation message (e.g., an nausf-ueauthentication message) indicating an authentication context identifier and response data from UE 114.

In step 512, V-SEPP 126 may receive the authentication confirmation message and may send the authentication confirmation message or a version thereof to H-SEPP 126 via an N-32 interface.

In step 513, H-SEPP 126 may receive the authentication confirmation message and may send the authentication confirmation message or a version thereof to AUSF 112 in H-PLMN 490.

In step 514, after receiving the authentication confirmation message, AUSF 112 may send obtained authentication confirmation information (e.g., in an nudm-ueauthentication confirmation message) to UDM 104 in H-PLMN 490.

In step 515, UDM 104 may receive the authentication confirmation information and respond by sending an authentication result and, optionally, a SUPI (e.g., in an nudm-ueauthentication confirmation response message) to AUSF 112.

In step 516, AUSF 112 may receive the authentication confirmation response information and may send an authentication confirmation response message (e.g., an nausf-ueauthentication response message) toward AMF 110 via H-SEPP 126.

In step 517, H-SEPP 126 and/or MV 204 may receive the authentication confirmation response message and may store authentication confirmation response information therein (e.g., an authentication result and a SUPI) with other stored information associated with UE 114.

In step 518, H-SEPP 126 may send the response message or a version thereof to V-SEPP 126 via an N-32 interface.

In step 519, V-SEPP 126 may receive the authentication confirmation response message and may send the authentication confirmation response message or a version thereof to AMF 110.

It will be appreciated that FIGS. 5A-5B are for illustrative purposes and that different and/or additional messages and/or actions may be used. It will also be appreciated that various messages and/or actions described herein may occur in a different order or sequence.

Figure 6:
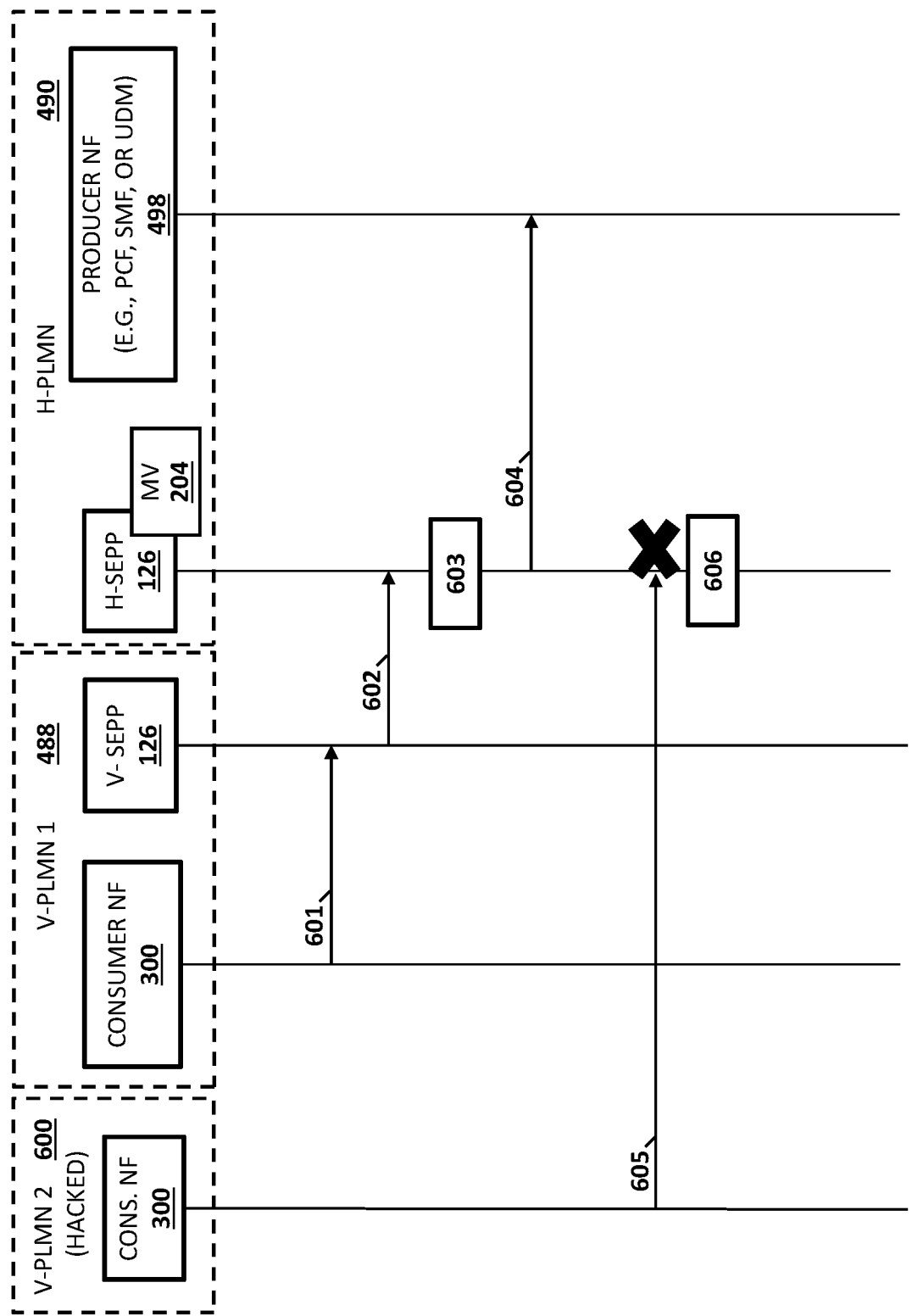
FIG. 6 is a message flow diagram illustrating example message validation in 5G communications networks.

FIG. 6 is a message flow diagram illustrating example message validation in 5G communications networks. In some embodiments, H-SEPP 126 or MV 204 therein may be configured to perform message validation using one or more identifier derived or obtained from an AKA procedure or related messages. For example, after identifying one or more UE related identifiers (e.g., a SUPI, a SUCI, a serving network name, etc.) from an AKA procedure associated with UE 114, H-SEPP 126 or MV 204 therein may monitor ingress inter-PLMN messages (e.g., HTTP/2 messages) associated with UE 114 and may determine whether each of the inter-PLMN messages are valid based on stored authentication information associated with UE 114 before processing, forwarding, and/or responding to the inter-PLMN messages. If H-SEPP 126 or MV 204 determines that authentication information fails to confirm or support that UE 114 is roaming in the network from which an inter-PLMN message originates, then H-SEPP 126 or MV 204 therein may deem the message invalid and perform an invalid message action, e.g., discarding one or more of the inter-PLMN and/or report the event to a network operator or a network management system. If H-SEPP 126 or MV 204 determines that the authentication information confirms or supports that UE 114 is roaming in the network from which the inter-PLMN message originates, then H-SEPP 126 or MV 204 therein may deem the message valid and perform a valid message action, e.g., allowing the inter-PLMN message to be received at an intended destination and processed.

Referring to FIG. 6, e.g., prior to steps 601-605, H-SEPP 126 or MV 204 therein may derive or obtain authentication information from an AKA related procedure. For example, H-SEPP 126 or MV 204 therein may derive or obtain UE related identifiers and a serving network name from AKA related messages used in authenticating UE 114 when it attempts to connect to the 5G home network or a related network (e.g., after UE 114 powers up). In this example, H-SEPP 126 or MV 204 therein may store the UE related identifiers and the serving network name for validating subsequent inter-PLMN messages (e.g., HTTP/2 messages) associated with UE 114 that traverse H-SEPP 126.

In step 601, e.g., after a relevant AKA procedure, an 5GC request associated with (or appearing to be associated with) UE 114 may be sent from consumer NF 300 in V-PLMN 1 488 to V-SEPP 126 for forwarding to H-SEPP 126 in H-PLMN 490. For example, consumer NF 300 in a V-PLMN 1 488 may represent a network node requesting information from UDM 104, PCF 102, or SMF 108 in H-PLMN 490.

In step 602, an 5GC request (e.g., as an HTTP/2 message) may be forwarded from V-SEPP 126 to H-SEPP 126 via an N32-f interface.

In step 603, H-SEPP 126 or MV 204 therein may receive the 5GC request and perform a message validation procedure. For example, H-SEPP 126 or MV 204 may identify a UE identifier (e.g., a SUPI) and an originating network identifier associated with a received 5GC request and may then compare the UE identifier and network identifier associated with the 5GC request to stored authentication information associated with UE 114 (e.g., derived or obtained from messages related to a recent AKA procedure for UE 114). In this example, H-SEPP 126 or MV 204 may deem the 5GC request valid if the stored authentication information associated with UE 114 supports or confirms that UE 114 is roaming in the network from which the 5GC request originates. Continuing with this example, H-SEPP 126 or MV 204 may deem the 5GC request invalid if the stored authentication information associated with UE 114 does not supports or confirms that UE 114 is roaming in the network from which the 5GC request originates, e.g., if the stored authentication information indicates that UE 114 is not roaming or is roaming in a different network.

In step 604, e.g., after determining that the 5GC request is valid, the 5GC request or a version thereof may be sent to producer NF 498 for further processing. For example, producer NF 498 may be a network node (e.g., UDM 104, PCF 102, or SMF 108) that receives requests for information and responds to those requests with the requested information.

In step 605, another 5GC request (e.g., as an HTTP/2 message) associated with (or appearing to be associated with) UE 114 may be sent from consumer NF 300 in V-PLMN 2 600 to H-SEPP 126 in H-PLMN 490. For example, consumer NF 300 in a V-PLMN 2 600 may be or appear to be a network node, such as a V-SEPP or another entity, in an actual PLMN. In this example, consumer NF 300 in a V-PLMN 2 600 may be compromised, hacked, or otherwise configured to perform or attempt to perform malicious or improper actions, such as initiate denial of service (DOS) attacks using inter-PLMN traffic or steal subscriber information from H-PLMN 490.

In step 606, H-SEPP 126 or MV 204 therein may receive the 5GC request perform a message validation procedure, determine that the 5GC request is invalid and perform an invalid message action, e.g., discard the 5GC request. For example, H-SEPP 126 or MV 204 may identify a UE identifier (e.g., a SUCI) and an originating network identifier associated with a received 5GC request and may then compare the UE identifier and the network identifier associated with the 5GC request to stored authentication information associated with UE 114. In this example, the stored authentication information may indicate that UE 114 is not roaming, thereby indicating that the 5GC request is invalid (e.g., fraudulent) and should not be answered.

It will be appreciated that FIG. 6 is for illustrative purposes and that different and/or additional messages and/or actions may be used. It will also be appreciated that various messages and/or actions described herein may occur in a different order or sequence.

Figure 7:
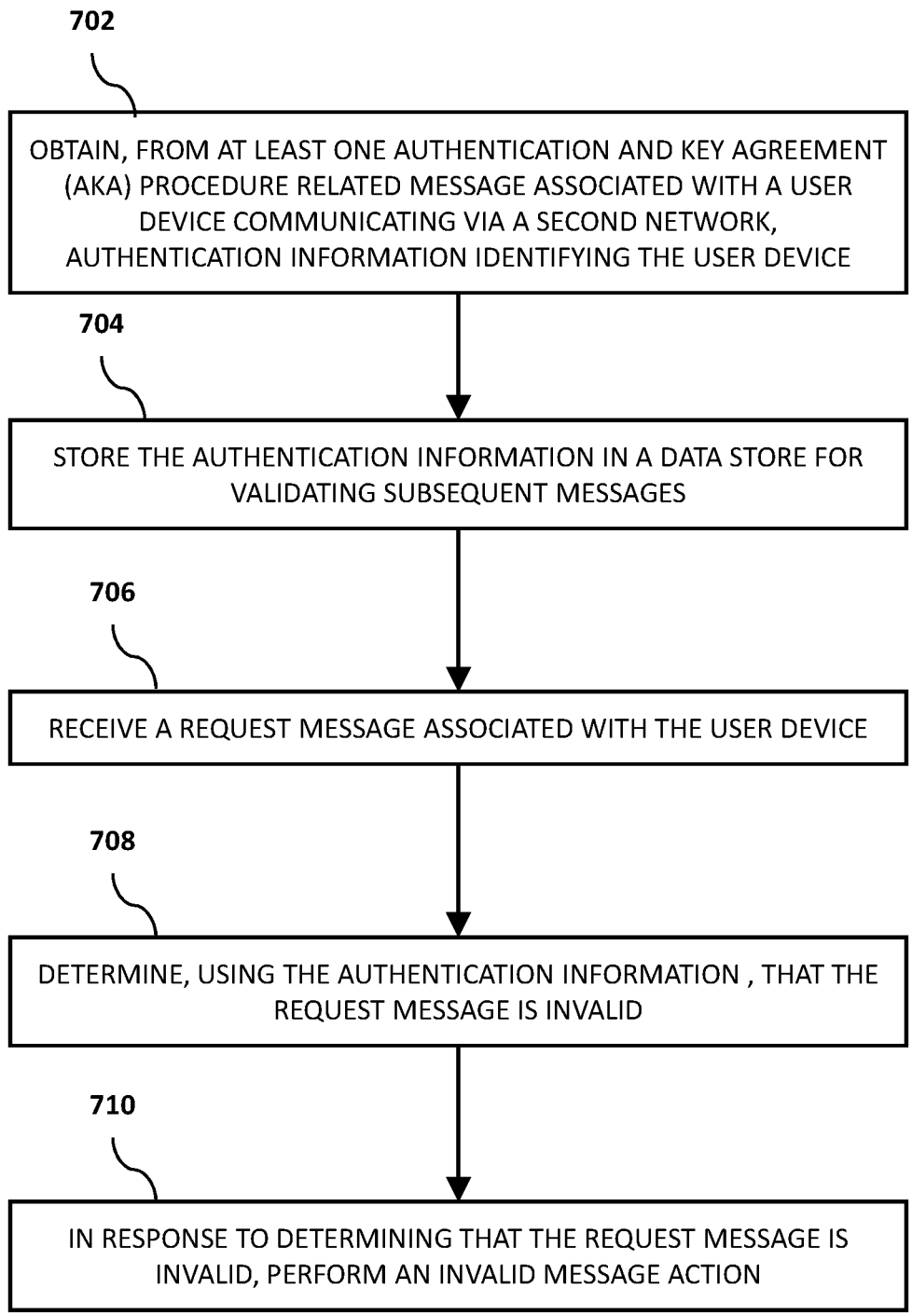
FIG. 7 is a flow chart illustrating an example process for message validation in 5G communications networks.

FIG. 7 is a diagram illustrating an example process 700 for message validation in 5G communications networks. In some embodiments, example process 700 described herein, or portions thereof, may be performed at or performed by node 200, MV 204, and/or another module or node.

Referring to example process 700, aspects (e.g., processing steps or actions) may occur at a network node of a first network (e.g., SEPP 126 or node 200 comprising MV 204 in a home 5GC network).

In step 702, authentication information may be obtained from at least one AKA procedure related message associated with a user device communicating via a second network, wherein the authentication information is usable for identifying a subscriber, the user device, or the second network.

In some embodiments, obtaining the authentication information from the at least one AKA procedure related message comprises obtaining a first identifier from a first AKA procedure related message and obtaining a second identifier different from the first identifier from a second AKA procedure related message.

In some embodiments, at least one AKA procedure related message may include one or more data types that include authentication information. For example, AKA procedure related message may contain an AuthenticationInfo data type, an UEAuthenticationCtx data type, a ConfirmationData data type, or a ConfirmationDataResponse data type.

In some embodiments, authentication information usable for identifying a user device may include a network identifier, a user equipment identifier, a network node identifier, a SUPI, a SUCI, a serving network name, or a PLMN identifier.

In some embodiments, a first network node may include a SEPP, a 5GC network function, a network proxy, or a network gateway.

In some embodiments, at least one AKA procedure related message may be sent to a first network node in a first network via a second network node in a second network. In such embodiments, the second network node may include a consumer NF, a PCF, an AMF, an SMF, an NRF, an NSSF, or a 5GC network function.

In step 704, the authentication information may be stored in a data store for validating subsequent messages. For example, data store 206 may include records or entries that associate a UE identifier (e.g., a SUPI or SUCI) and other authentication information (e.g., a serving network name or identifier, an authentication context identifier, and/or an authentication result indicating that the authentication was successful). In another example, data store 206 may include records or entries that associate various types of information usable for identifying and/or authenticating user devices or UEs and that are indexed using one or more keys, e.g., unique UE identifiers, a unique authentication context identifier, or a unique combination of identifiers.

In step 706, a request message associated with the user device. For example, an entity appearing to be AMF 110 may send a nudm-uecm service request associated with UE 114 toward UDM 104 which H-SEPP 126 may receive via an N32-f interface.

In some embodiments, a request message may include a 5GC request message. For example, a request message may be a nudm-sdm service message, a nudm-uecm service message, a npcf-uepolicy service message, a nsmf-pdusession service message, a nnrf-disc service message, or a nnrf-nfm service message.

In step 708, it may be determined, using the authentication information, that the request message is invalid. For example, H-SEPP 126 or functionality therein (e.g., MV 204) may identify a UE identifier and an originating network associated with a request message and may compare it to stored authentication information corresponding to the UE identifier. In this example, if the store authentication information does not confirm or support that the associated UE is currently roaming in the network from which the request originates, then the message will be deemed invalid.

In some embodiments, determining, using authentication information, that a request message is invalid may comprise retrieving, using an user device identifier (e.g., a SUPI) in the request message, the authentication information from a data store (e.g., data storage 206) and determining that the authentication information fails to confirm that the user device is roaming in the network from which the request message originates.

In step 710, in response to determining that the request message may be invalid, an invalid message action may be performed. For example, an invalid message action may include discarding a request message or notifying a network operator or a management system.

In some embodiments, a first network may be a home PLMN (e.g., H-PLMN 490) and a second network may be a visited PLMN (e.g., V-PLMN 2 600).

It will be appreciated that process 700 is for illustrative purposes and that different and/or additional actions may be used. It will also be appreciated that various actions described herein may occur in a different order or sequence.

It will be appreciated that while some aspects of the subject matter described herein has been discussed with reference to 5G networks various other networks may utilize some aspects of the subject matter described herein. For example, any network that utilize the 5G AKA procedure or a similar authentication procedure may use features, mechanisms and techniques described herein to obtain or derive authentication information and use that authentication information when performing message validation.

It should be noted that node 200, MV 204, and/or functionality described herein may constitute a special purpose computing device. Further, node 200, MV 204, and/or functionality described herein can improve the technological field of network security and/or message validation in a 5G network. For example, by performing message validation based on UE authentication information (e.g., a SUPI, a PLMN identifier, and an UE authentication status) at H-SEPP 126, malicious activities and their negative consequences (e.g., revenue fraud, network congestion, service failures, and/or poor user experience) can be mitigated and/or prevented. In this example, by utilizing one or more techniques and/or methods described herein, H-SEPP 126 or MV 204 therein can prevent DOS attacks that use inter-PLMN traffic, prevent theft of subscriber data from H-PLMN 490, and/or implement SUPI or subscriber level authorization (e.g., so that a consumer NF can access only specific UE data). Further, such techniques and/or methods described herein, are applicable to multiple services or related interfaces including, for example, nudm-sdm, nudm-uecm, npcf-uepolicy, nsmf-pdusession, nssf-nsselection, nnrf-disc, and/or nnrf-nfm.

The disclosure of each of the following references is incorporated herein by reference in its entirety to the extent not inconsistent herewith and to the extent that it supplements, explains, provides a background for, or teaches methods, techniques, and/or systems employed herein.

REFERENCES 1. 3GPP TS 29.510; $3^{rd}$ Generation Partnership Project; Technical Specification Group Core Network and Terminals; 5G System; Network Function Repository Services; Stage 3 (Release 16), V16.5.0 (2020 September).
2. 3GPP TS 23.003; $3^{rd}$ Generation Partnership Project; Technical Specification Group Core Network and Terminals; Numbering, addressing and identification (Release 16), V16.4.0 (2020 September).
3. 3GPP TS 29.573; $3^{rd}$ Generation Partnership Project; Technical Specification Group Core Network and Terminals; 5G System; Public Land Mobile Network (PLMN) Interconnection; Stage 3 (Release 16) V16.4.0 (2020 September).
4. 3GPP TS 33.501; $3^{rd}$ Generation Partnership Project; Technical Specification Group Services and System Aspects; Security Architecture and Procedures for the 5G System; (Release 16), V16.4.0 (2020 September).
5. 3GPP TS 29.509; $3^{rd}$ Generation Partnership Project; Technical Specification Group Core Network and Terminals; 5G System; Authentication Server Services; Stage 3 (Release 16), V16.5.0 (2020 September).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for message validation in fifth generation (5G) communications networks, the method comprising:
    at a security edge protection proxy (SEPP) of a first network:
        obtaining, from at least one authentication and key agreement (AKA) procedure related message associated with a user device communicating via a second network, authentication information identifying the user device, wherein obtaining the authentication information occurs when the at least one AKA procedure related message is traversing the SEPP to reach a destination other than the SEPP;
        storing the authentication information in a data store for validating subsequent messages;
        receiving a request message associated with the user device;
        determining, using the authentication information in the data store, that the request message is invalid, wherein determining, using the authentication information, that the request message is invalid comprises retrieving, using a user device identifier in the request message, the authentication information from the data store and determining that the authentication information fails to confirm that the user device is roaming in the network from which the request message originates; and
        in response to determining that the request message is invalid, performing an invalid message action.

2. The method of claim 1 wherein the request message includes a 5G core request message.

3. The method of claim 1 wherein the at least one AKA procedure related message includes one or more data types that include the authentication information.

4. The method of claim 1 wherein the authentication information includes an authentication status, a network identifier, a network node identifier, a subscription permanent identifier (SUPI), a serving network name, or a public land mobile network (PLMN) identifier.

5. The method of claim 1 wherein the at least one AKA procedure related message is sent via a second network node of the second network, wherein the second network node includes a consumer network function (NF), a policy control function (PCF), an access and nobility management Function (AMF), a session management function (SMF), a network repository function (NRF), a network slice selection function (NSSF), or a 5G core network function.

6. The method of claim 1 wherein the invalid message action includes discarding the request message or notifying a network operator or a management system.

7. The method of claim 1 wherein the first network is a home public land mobile network (PLMN) and the second network is a visited PLMN.

8. A system for message validation in fifth generation (5G) communications networks, the system comprising:
   a security edge protection proxy (SEPP) of a first network comprising:
   at least one processor; and
   a memory,
   wherein the SEPP is configured for:
   obtaining, from at least one authentication and key agreement (AKA) procedure related message associated with a user device communicating via a second network, authentication information identifying the user device, wherein obtaining the authentication information occurs when the at least one AKA procedure related message is traversing the SEPP to reach a destination other than the SEPP;
   storing the authentication information in a data store for validating subsequent messages;
   receiving a request message associated with the user device;
   determining, using the authentication information in the data store, that the request message is invalid, wherein determining, using the authentication information, that the request message is invalid comprises retrieving, using a user device identifier in the request message, the authentication information from the data store and determining that the authentication information fails to confirm that the user device is roaming in the network from which the request message originates; and
   in response to determining that the request message is invalid, performing an invalid message action.

9. The system of claim 8 wherein the request message includes a 5G core request message.

10. The system of claim 8 wherein the at least one AKA procedure related message includes one or more data types that include the authentication information.

11. The system of claim 8 wherein the authentication information includes an authentication status, a network identifier, a network node identifier, a subscription permanent identifier (SUPI), a serving network name, or a public land mobile network (PLMN) identifier.

12. The system of claim 8 wherein the at least one AKA procedure related message is sent via a second network node of the second network, wherein the second network node includes a consumer network function (NF), a policy control function (PCF), an access and mobility mangy gementFunction (AMF), a session e function (SMF), a network repository function (NRF), a network slice selection function (NSSF), or a 5G core network function.

13. The system of claim 8 wherein the invalid message action includes discarding the request message or notifying a network operator or a management system.

14. The system of claim 8 wherein the first network is a home public land mobile network (PLMN) and the second network is a visited PLMN.

15. A non-transitory computer readable medium having stored thereon executable instructions that when executed by at least one processor of a computer cause the computer to perform steps comprising:
   at a security edge protection proxy (SEPP) of a first network:
   obtaining, from at least one authentication and key agreement (AKA) procedure related message associated with a user device communicating via a second network, authentication information identifying the user device, wherein obtaining the authentication information occurs when the at least one AKA procedure related message is traversing the SEPP to reach a destination other than the SEPP;
   storing the authentication information in a data store for validating subsequent messages;
   receiving a request message associated with the user device;
   determining, using the authentication information in the data store, that the request message is invalid, wherein determining, using the authentication information, that the request message is invalid comprises retrieving, using a user device identifier in the request message, the authentication information from the data store and determining that the authentication information fails to confirm that the user device is roaming in the network from which the request message originates; and
   in response to determining that the request message is invalid, performing an invalid message action.

* * * * *

UNITED STATES PATENT AND TRADEMARK OFFICE
CERTIFICATE OF CORRECTION

PATENT NO. : 11,818,570 B2
APPLICATION NO. : 17/123038
DATED : November 14, 2023
INVENTOR(S) : Rajput et al.

It is certified that error appears in the above-identified patent and that said Letters Patent is hereby corrected as shown below:

On the Title Page

Column 1, item [73], under Assignee, Lines 2-3, delete "Redwood Shores (CA)" and insert
-- Redwood Shores, CA (US) --, therefor.

On page 4, Column 2, item [56], under Other Publications, Line 38, delete "Generarion" and insert
-- Generation --, therefor.

On page 5, Column 1, item [56], under Other Publications, Line 34, delete "to" and insert
-- alliance-to --, therefor.

On page 5, Column 1, item [56], under Other Publications, Line 35, delete "Mar" and insert -- May --,
therefor.

On page 5, Column 1, item [56], under Other Publications, Line 53, delete "Servivces" and insert
-- Services --, therefor.

On page 7, Column 1, item [56], under Other Publications, Line 2, delete "Filerting" and insert
-- Filtering --, therefor.

On page 8, Column 1, item [56], under Other Publications, Line 22, delete "an" and insert -- and --,
therefor.

On page 8, Column 1, item [56], under Other Publications, Line 62, delete "Alloance" and insert
-- Allowance --, therefor.

On page 8, Column 2, item [56], under Other Publications, Line 43, delete "Unpubished," and insert
-- Unpublished, --, therefor.

Signed and Sealed this
Eleventh Day of June, 2024

Katherine Kelly Vidal
*Director of the United States Patent and Trademark Office*

CERTIFICATE OF CORRECTION (continued)
U.S. Pat. No. 11,818,570 B2

On page 8, Column 2, item [56], under Other Publications, Line 50, delete "EDG" and insert -- EDGE --, therefor.

On page 9, Column 1, item [56], under Other Publications, Line 10, delete "Generatio" and insert -- Generation --, therefor.

In the Specification

In Column 1, Lines 33-34, delete "network function repository function (NRF)." and insert -- network repository function (NRF). --, therefor.

In Column 10, Line 62, delete "FIG." and insert -- FIGS. --, therefor.

In the Claims

In Column 17, Line 15, in Claim 5, delete "nobility" and insert -- mobility --, therefor.

In Column 18, Lines 15-16, in Claim 12, delete "mangy gementFunction (AMF), a session e" and insert -- management Function (AMF), a session management --, therefor.